United States Patent
Doyle et al.

(10) Patent No.: US 9,613,343 B2
(45) Date of Patent: Apr. 4, 2017

(54) SYSTEM AND METHOD FOR COMPOSITING ITEMS AND AUTHORIZING TRANSACTIONS

(75) Inventors: Paul F. Doyle, Ada, MI (US); Dean Tribble, Bellevue, WA (US)

(73) Assignee: Deluxe Small Business Sales, Inc., Shoreview, MN (US)

( * ) Notice: Subject to any disclaimer, the term of this patent is extended or adjusted under 35 U.S.C. 154(b) by 16 days.

(21) Appl. No.: 13/351,919

(22) Filed: Jan. 17, 2012

(65) Prior Publication Data

US 2012/0185387 A1 Jul. 19, 2012

Related U.S. Application Data

(60) Provisional application No. 61/432,995, filed on Jan. 14, 2011.

(51) Int. Cl.
  *G06Q 20/10* (2012.01)
  *G06Q 40/00* (2012.01)
(52) U.S. Cl.
  CPC .......... *G06Q 20/108* (2013.01); *G06Q 40/00* (2013.01)
(58) Field of Classification Search
  None
  See application file for complete search history.

(56) References Cited

U.S. PATENT DOCUMENTS

| | | | |
|---|---|---|---|
| 5,884,271 A * | 3/1999 | Pitroda | 705/2 |
| 7,792,748 B1 * | 9/2010 | Ebersole et al. | 705/39 |
| 2001/0037318 A1 | 11/2001 | Lindskog et al. | |
| 2001/0044764 A1 * | 11/2001 | Arnold | G06Q 20/04 705/35 |
| 2002/0113122 A1 * | 8/2002 | Brikho | G06Q 20/0425 235/379 |
| 2003/0084001 A1 | 5/2003 | Chang et al. | |
| 2004/0128513 A1 * | 7/2004 | Wu et al. | 713/176 |
| 2005/0033685 A1 * | 2/2005 | Reyes | G06Q 20/04 705/39 |
| 2006/0161501 A1 | 7/2006 | Waserstein et al. | |

(Continued)

FOREIGN PATENT DOCUMENTS

| CN | 101051372 A | 10/2007 |
|---|---|---|
| EP | 2663959 A2 | 11/2013 |

(Continued)

OTHER PUBLICATIONS

Dictionary entries for "maker".*

(Continued)

*Primary Examiner* — Robert R Niquette
(74) *Attorney, Agent, or Firm* — Schwegman Lundberg & Woessner, P.A.

(57) ABSTRACT

A method of executing an electronic financial transaction involving two parties providing information for generating a transaction document and authorizing the document to execute the transaction. The method contemplates the maker electronically transmitting a data record representative of the financial transaction directly to a payee, such as by email. The payee can then convert the data record into a transaction acceptable to a bank of first deposit, such as by printing or imaging the data record into a form acceptable to the bank, such as a standard paper check.

21 Claims, 27 Drawing Sheets

(56) References Cited

U.S. PATENT DOCUMENTS

| | | | |
|---|---|---|---|
| 2007/0112674 A1* | 5/2007 | Jones ................ G06Q 20/04 705/45 |
| 2007/0185822 A1 | 8/2007 | Kaveti et al. |
| 2007/0271183 A1* | 11/2007 | Foth ................. G06Q 20/04 705/45 |
| 2008/0086421 A1* | 4/2008 | Gilder et al. .................. 705/44 |
| 2008/0249951 A1 | 10/2008 | Gilder et al. |
| 2008/0319874 A1* | 12/2008 | Levchin ............. G06Q 20/02 705/26.1 |
| 2009/0210342 A9* | 8/2009 | Wilson ............................ 705/40 |
| 2009/0248555 A1 | 10/2009 | Sada et al. |
| 2009/0261158 A1* | 10/2009 | Lawson .............. G07D 7/0033 235/379 |
| 2009/0319427 A1 | 12/2009 | Gardner et al. |
| 2010/0161466 A1* | 6/2010 | Gilder ................ G06Q 20/04 705/34 |
| 2010/0198733 A1* | 8/2010 | Gantman ............. G06Q 20/02 705/75 |
| 2011/0264558 A1 | 10/2011 | Alexandrou |
| 2012/0024946 A1* | 2/2012 | Tullis et al. ................... 235/379 |
| 2012/0310782 A1 | 12/2012 | Konakanchi et al. |
| 2013/0013456 A1* | 1/2013 | Boesch ................ G06Q 20/04 705/26.41 |
| 2013/0060679 A1 | 3/2013 | Oskolkov et al. |
| 2015/0088740 A1 | 3/2015 | Doyle et al. |

FOREIGN PATENT DOCUMENTS

| | | | |
|---|---|---|---|
| JP | 11503541 A | 3/1999 |
| JP | 2000113089 A | 4/2000 |
| JP | 2002245248 A | 8/2002 |
| JP | 2004005515 A | 1/2004 |
| JP | 2006268636 A | 10/2006 |
| JP | 2014502770 | 2/2014 |
| TW | 200411596 A | 7/2004 |
| WO | WO-2010091184 A1 | 8/2010 |

OTHER PUBLICATIONS

Methven and Associates accessed using archive.org.*
"Compositing" Webster's Dictionary © 2000.*
"Compositing" Dictionary of International Business Terms, 2000.*
Methven & Associates—California Business, Contract, Securities, Estate and Probate Law. http://www.methvenlaw.com, 2010.*
Jeong Jae Lee, International Search Report, Aug. 17, 2012, 3 pages, Korean Intellectual Property Office, Republic of Korea.
"U.S. Appl. No. 14/561,458, Final Office Action mailed Nov. 9, 2015", 18 pgs.
"U.S. Appl. No. 14/561,458, Non Final Office Action mailed Jun. 23, 2015", 17 pgs.
"U.S. Appl. No. 14/561,458, Response filed Oct. 23, 2015 to Non-Final Office Action mailed Jun. 23, 2015", 11 pgs.
"U.S. Appl. No. 14/561,458, Response filed Apr. 6, 2016 to Final Office Action mailed Nov. 9, 2015", 11 pgs.
"Chinese Application Serial No. 201280013080.3, Office Action mailed Dec. 21, 2015", w/ English Translation, 19 pgs.
"Japanese Application Serial No. 2013-549610, Notice of Reason for Refusal mailed Nov. 5, 2015", With English translation, 5 pgs.

* cited by examiner

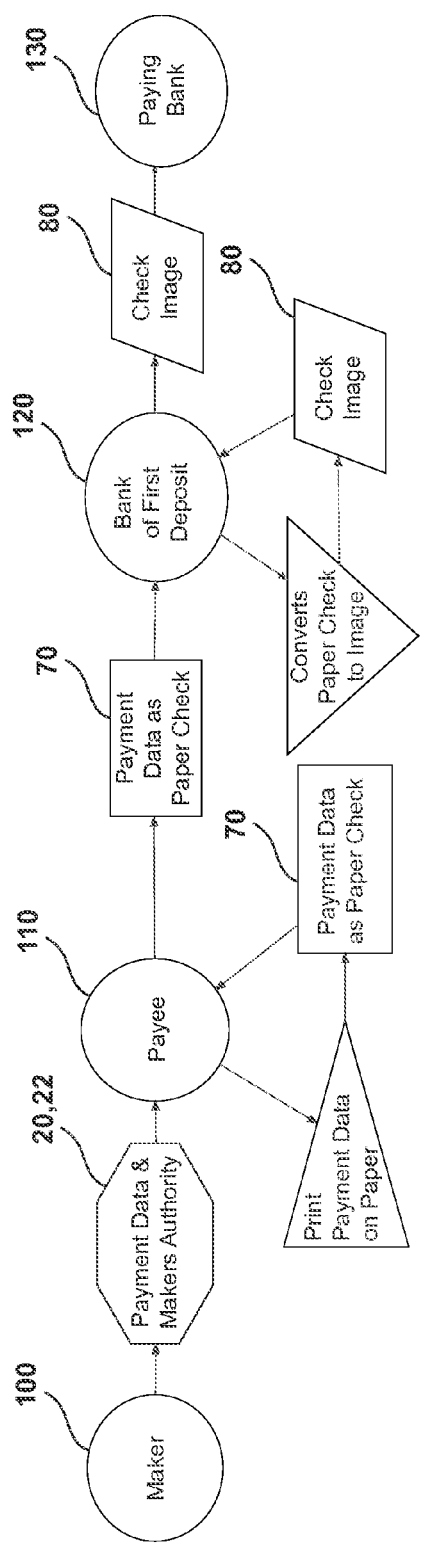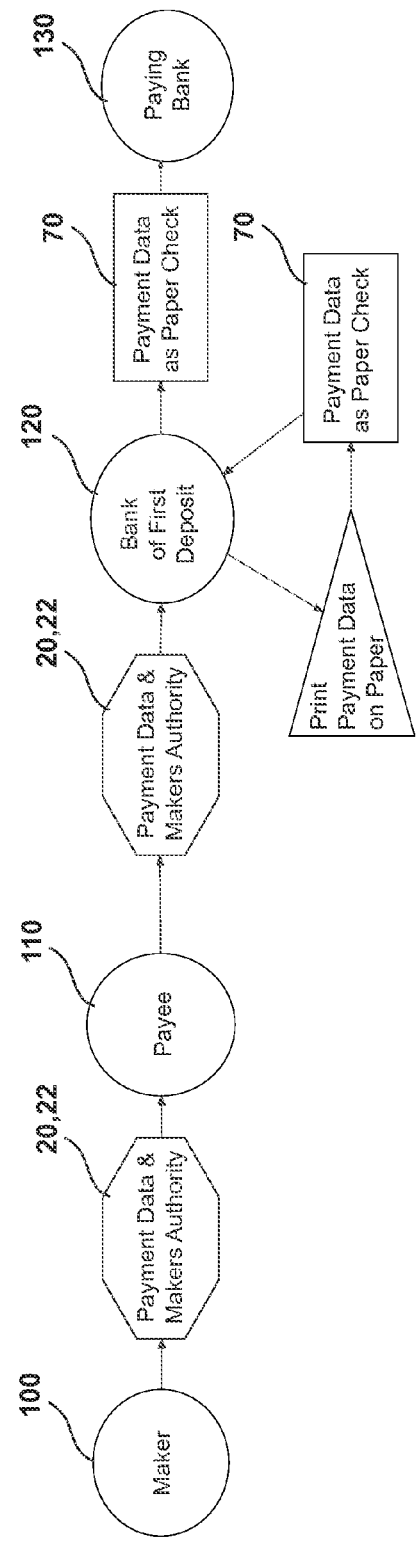
FIG. 3
FIG. 4

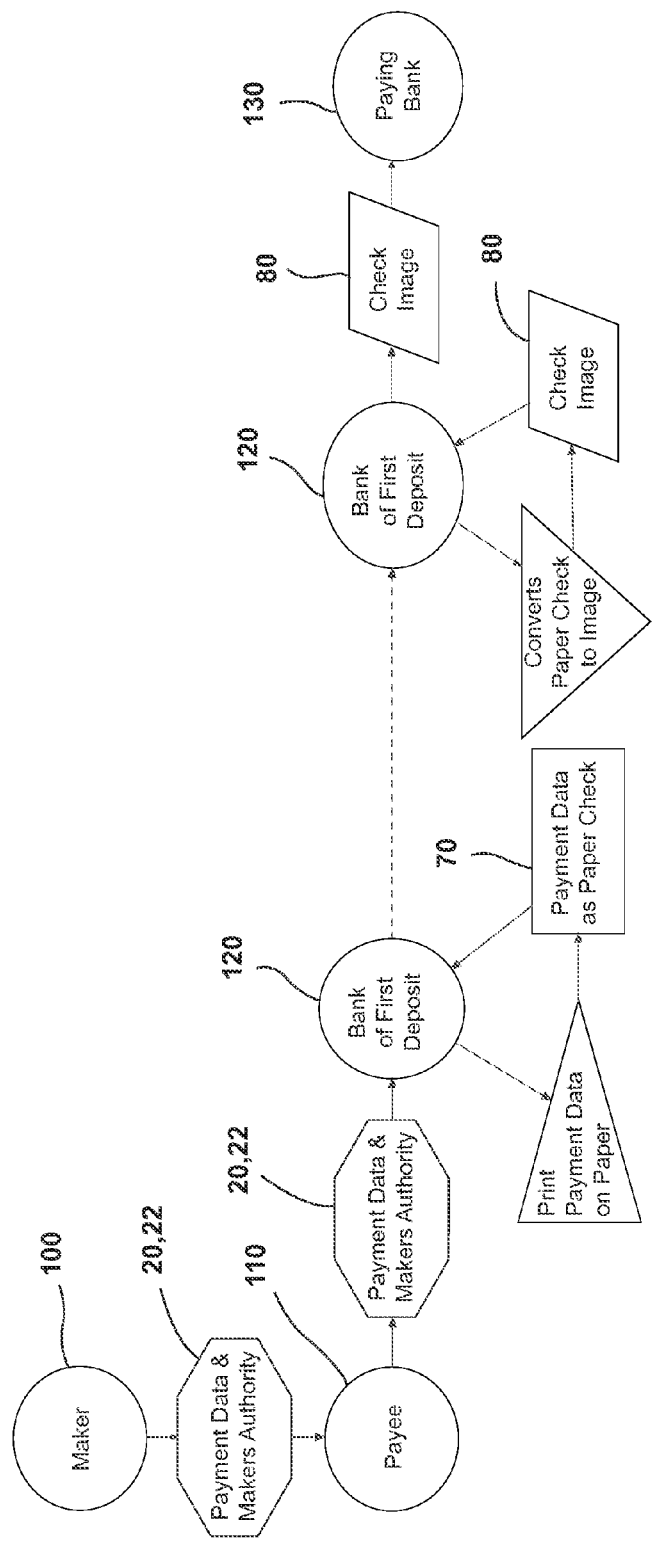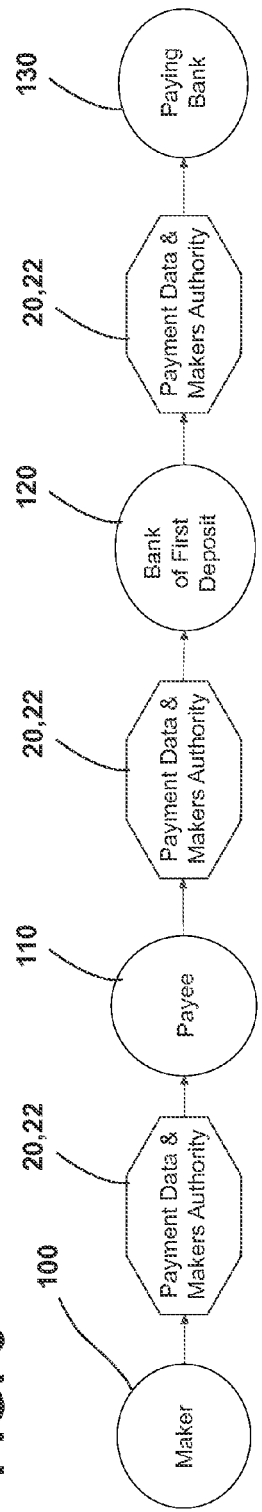
FIG. 5
FIG. 6

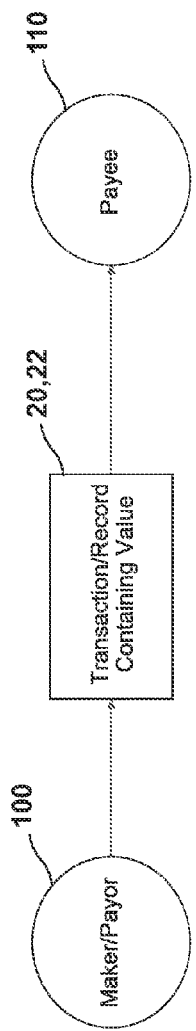
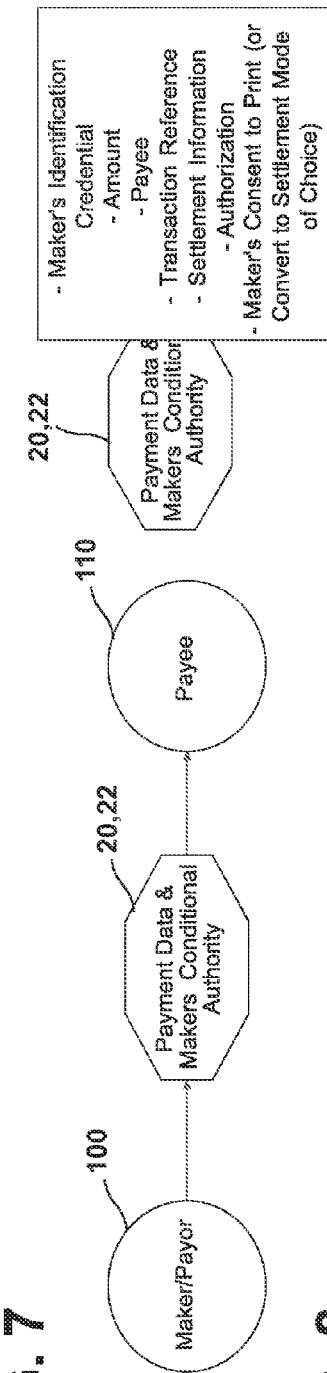
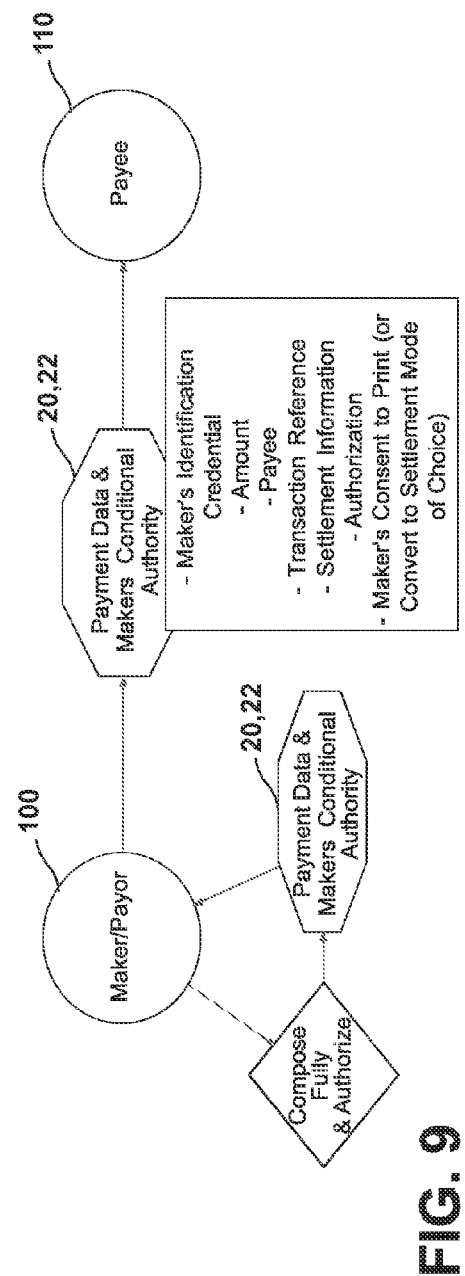
FIG. 7
FIG. 8
FIG. 9

US 9,613,343 B2

SYSTEM AND METHOD FOR COMPOSITING ITEMS AND AUTHORIZING TRANSACTIONS

CROSS-REFERENCE TO RELATED APPLICATIONS

This application claims the benefit of U.S. Provisional Patent Application No. 61/432,995, filed Jan. 14, 2011, which is incorporated herein by reference in its entirety.

BACKGROUND OF THE INVENTION

The ability to pass value and payments remotely, quickly, efficiently, economically, and securely enables many conveniences of modern life including internet sales, and electronic peer-to-peer transactions, such as over eBay®. Physical payments, such as by mailing a check or cash, can be slow, expensive, and insecure. Additionally, users/check writers may make mistakes when writing checks, such as mistyping the payee's name. Carrying cash can be problematic from the standpoint of pickpocketing and other forms of theft that can present a personal security threat to an individual (i.e. armed robbery or muggings).

As a result, financial transactions are commonly made by way of electronic communications networks to purchase a variety of goods and services. Such transactions may be processed in a variety of methods using a variety of processors including, for example, credit card companies, debit card companies, automated clearing house (ACH) transactions, and other third party processors such as PayPal®.

Credit cards and debit cards operate on closed proprietary networks to which a payee has to subscribe, such as by having a merchant account. Furthermore, a merchant may be required to have specialized equipment to carry out transactions using credit cards and debit cards. Often times, credit card and debit card transactions can be very expensive (up to 3% of the transaction), due to fees charged by the credit card companies and the credit card processors. Due to the transaction fees, the risk of transaction reversals resulting from disputes, and other risks and inconveniences, some merchants are unwilling to accept credit cards and debit cards for transacting.

FIGS. 1 and 2 illustrate examples of conventional transactions between a maker 100 and a payee 110 in which a paper check 70 is physically sent to the payee 110 by the maker 100. The paper check 70 is presented to a bank of first deposit 120 and the paper check continues through the clearance process as a paper check (FIG. 1) or an image 80 of the paper check 70 (FIG. 2) until it reaches the maker's 100 paying bank 130.

BRIEF DESCRIPTION OF THE INVENTION

A method of executing an electronic financial transaction involving at least two parties providing information for generating a transaction document and authorizing the document to execute the transaction. The method contemplates the maker electronically transmitting a data record representative of the financial transaction directly to a payee, such as by email or SMS. The payee can then convert the data record into a transaction acceptable to a bank of first deposit, such as by printing or imaging the data record into a form acceptable to the bank, such as a standard paper check.

In one aspect, the invention comprises a method of executing a financial transaction between a first and second party by the generation of an authorized transaction record comprising the steps of the first party providing a first set of information required for generating the transaction record, the second party providing a second set of information required for generating the transaction record, combining the first and second set of information to generate the transaction record, upon verification of both the first and second set of information, the first party authorizing the transaction record to generate an authenticated transaction record, and the second party providing access to the authorized transaction record to a third party to execute the financial transaction.

As a further aspect, the invention comprises a system for generating a transaction record comprising a first device running a first application software and a second device running a second application software, wherein the first device providing a first set of information required for generating the transaction record, the second device providing a second set of information required for generating transaction record, combining the first and second set of information to generate a transaction record, and upon verification of both the first and second set of information, the first device authorizing the transaction record to generate an authenticated transaction record.

In multiple aspects of the invention, the transaction record can be a physical document or check, or an electronic transaction record. Various embodiments of the invention are contemplated. In one aspect, a method for compositing information and authorizing a financial transaction can comprise the steps of: forming, by a maker, a data record representative of a financial transaction with a payee; electronically transmitting the data record representative of the financial transaction directly to the payee, wherein the electronic transmission includes an authorization by the maker to the payee to deposit or cash (negotiate) the financial transaction; wherein the payee can continue the processing of the financial transaction by presenting the transaction to a bank of first deposit.

In other aspects of the invention, the step of transmitting the data record can comprise sending an email to the payee. The step of transmitting the data record can include attachment of a file to the email which includes a printable representation of a check representative of the financial transaction. The step of transmitting the data record can include the step of emailing a data file which contains data that can be constructed into at least one of a physical check and an electronic image of a check compliant with Check 21 standards. The method can further comprise the step of registering data representative of the financial transaction between the maker and the payee with a third party service, whereby a processing bank can verify the accuracy of the data representative of the financial transaction. The method can also include the step of sending a portion of the data record representative of the financial transaction to the payee with an identifier of where the remainder of the critical data to construct the data can be retrieved and submitted to the bank of first deposit as a complete transaction.

The method can also include the step of retrieving missing critical data constituting the financial transaction prior to or at the time of presentment to a bank of first deposit. The method can also include the step of electronically signing a graphical representation of the check at the time of making of the data record representative of the financial transaction, and the step of electronically transmitting the transaction includes the step of transmitting the graphical representation of the check to the payee. The method can also include the step of the payee physically printing the graphical representation of the check prior to presentment to a bank of first deposit.

The method can also include an interface located on a global computer network for performing at least one of: (a) receiving physical address information regarding at least one maker; (b) receiving bank account information regarding at least one maker; (c) receiving information regarding at least one payee for the at least one maker; (d) receiving payment information regarding a payee and an amount, wherein the payment information can be entered into an interface reflecting a standard paper check layout. The step of creating the data record representative of the financial transaction can also include the step of constructing the data record from stored information entered into the interface.

The method of creating a single data record can also comprise uploading a batch of data records and creating multiple transactions to at least one payee in a batch format. The upload file can comprise a well-known data format including, but not limited to, a Positive Pay file format.

Upon receiving the transmission, the payee can perform at least one of the following to present the payment transmission to a bank of first deposit: (a) printing the payment transmission into a form representative of a traditional paper check; and (b) transmitting a graphical representation of the payment transmission to the bank of first deposit. The method can further comprise the step of providing a cryptographic or trusted time stamp associated with the transaction to prevent tampering with, or multiple presentment of, the financial transaction to multiple banks of first deposit. The method can also include the step of the payee selecting the form of the transaction for presentment to the bank of first deposit. The method can also include the step of the maker providing a plurality of payment settlement modalities to the payee, and the payee can select from at least one of the provided plurality of payment settlement modalities for presentment to a bank of first deposit or other settlement representative based on the selected settlement mode to settle the transaction received from the maker.

BRIEF DESCRIPTION OF THE DRAWINGS

In the drawings:

FIG. 3 is a flow chart showing an exemplary system and method according to the invention of compositing transaction information and authorizing a transaction.

FIG. 3I is a message provided to a login user on the interface for the step of authorizing the check data record.

FIG. 3O is a sample of the content of the e-mail sent to the payees e-mail account by the web interface login user.

FIG. 4 is a flow chart showing the exemplary system and method of FIG. 3 according to the invention of compositing transaction information and authorizing a transaction in which the payee retransmits payment data and maker's authority to a bank of first deposit, wherein the bank of first deposit converts the payment data into a paper check.

FIG. 5 is a flow chart showing the exemplary system and method of FIG. 3 according to the invention of compositing transaction information and authorizing a transaction in which the payee has forwarded the maker's payment data and authority to the bank of first deposit and the bank of first deposit has printed the payment data as a paper check or converted the paper check to a check image and continued processing of the financial transaction.

FIG. 6 is an exemplary flowchart in which the payee and the bank of first deposit have both forwarded the payment data and maker's authority of the financial transaction generated by the maker to continue processing the financial transaction according to the invention.

FIG. 7 is an exemplary schematic showing a transaction/data record containing value transmitted from a maker to a payee.

FIG. 8 is an exemplary schematic of payment data and maker's conditional authority being transmitted from a maker to a payee in which the payment data and maker's conditional authority can include items such as a maker's identification credential, an amount, the payee, a transaction reference, settlement information, authorization, and maker's consent to print the payment data or convert to a settlement mode of the payees choice.

FIG. 9 is an exemplary schematic according to the invention of a maker composing and fully authorizing a data record representative of a financial transaction, indicating that the data record is payment data and the maker's conditional authority, transmitting the payment data and maker's conditional authority to a payee which includes maker's identification credential, an amount, a payee, a transaction reference, a settlement authorization, information, and authorization, and maker's consent to print the payment data or to convert to a settlement mode of the payees choice, to the payee.

DETAILED DESCRIPTION OF THE INVENTION

Figure 1:
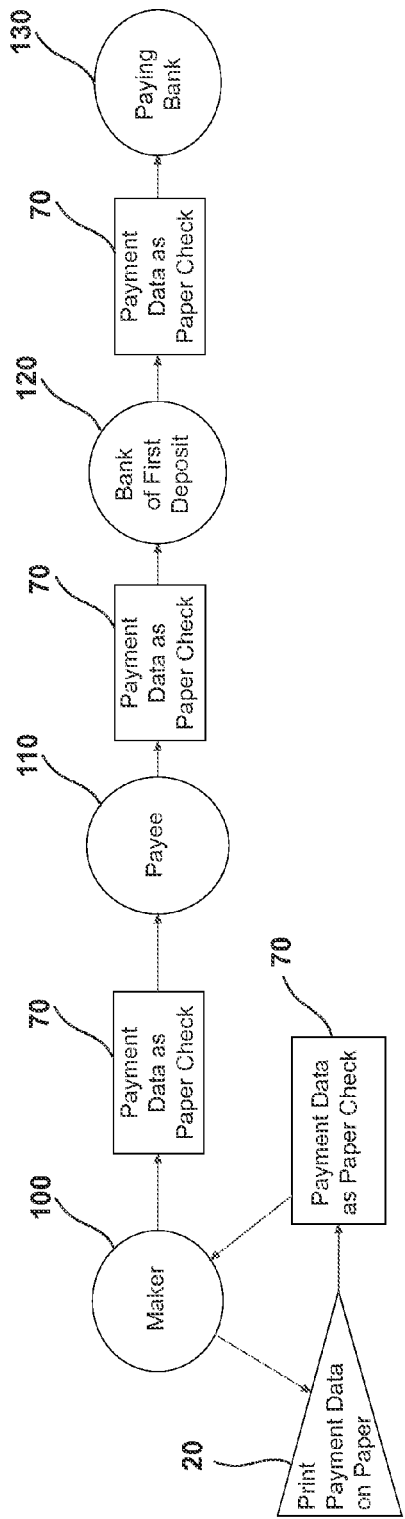
FIG. 1 is a flow chart illustrating a prior art method of submitting a paper check through a financial clearance process.
Figure 2:
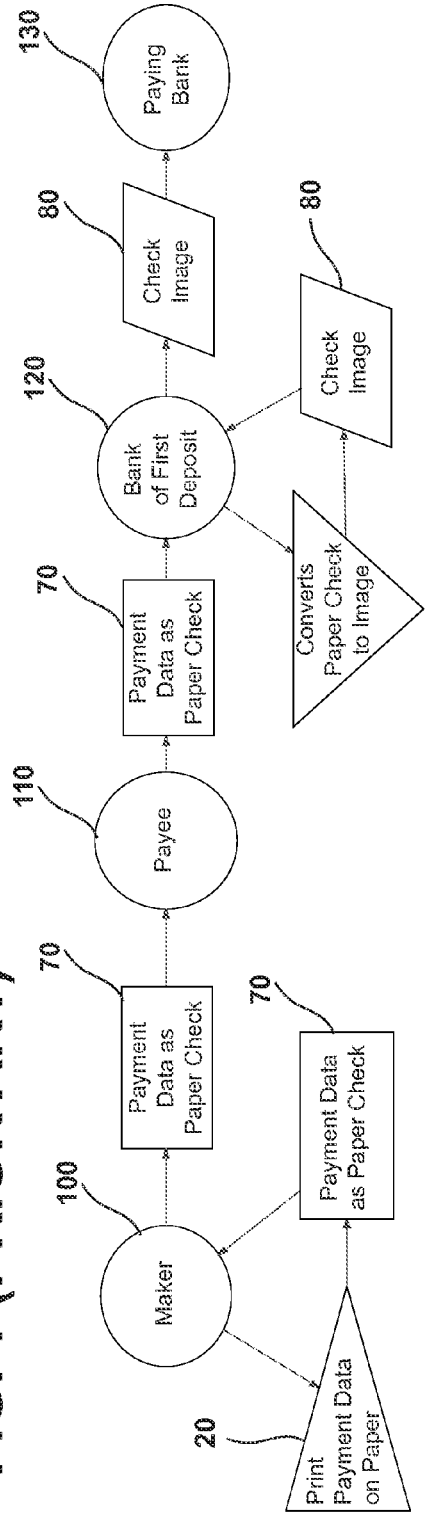
FIG. 2 is a flow chart illustrating another prior art method of submitting a paper check through a financial clearance process, in which a depositing bank images the paper check after presentment to a bank of first deposit.

In one embodiment, the invention is related to legally enforceable transactions, payments, agreements, instructions, contracts, stock certificates, bonds, prescriptions, laws, judgments, etc. Although the primary field of use of the invention is for financial transactions, the invention can be used for a variety of other transactions, such as for certifying a variety of other documents and contracts, or for iteratively filling a contractual agreement.

To be able to pass value, such as monetary value, to be sent to another party. The party to which value is sent (payee) may be located remotely from the party sending payment (payer). The value is passed and transacted between two or more parties using any communications network, including public and non-proprietary networks such as the internet. The invention, in effect, modernizes the well-established legal form of payment of the check.

The invention further allows parties to pass between themselves independent writings or information with memorialization or evidence of a transaction or contract.

For parties that are not remotely located from each other, the methods disclosed herein provide an economical, secure, user friendly, and easy to use method of executing transactions. As a result the parties need not carry cash, checks, or credit cards to make a financial transaction.

Referring now to FIG. 3, the method 10 of completing a financial transaction according to the invention is disclosed. The method 10 creates an electronic check by composition of information from at least one of a maker 100 and a payee 110. Additional information for the assembly of the check can be provided by one or more of a deposit bank 120, a paying bank 130, and a third party service 140. The method 10 to carry out the transaction may be carried out over a communications network such as the internet.

The maker 100 of the check 70 can send the critical data elements 20, such as bank routing number, account number, check number, dollar amount, payee, date, memo, and an instance of the maker's signature 22 or an electronic signature or a proxy/reference value derived from some or all the other data elements (i.e. a hash value or a cryptographic/trusted time stamp) (this can include the addition of data, such as a secret value, added to enhance the security or cryptographic properties by increasing numeric complexity) as a text and numerical objects over the communications network. From this information, a partially completed check 30 is generated along with a check form 40 and sent as an object or image of the partially completed check 50 to the payee 110 who can then composite it at their location for printing or imaging or they can send it on to their bank 130 who can composite it and either print or image it. Incremental check information and check form 40 along with the image of the partially completed check are used to form the complete and authorized check 70 after the maker is given an opportunity to review all associated information and then authorize the check. After authorizing the transaction and generating a complete check, the image 80 thereof may be printed or stored by the payee 110, the payee's bank 130, the maker's bank 130, or the maker 100.

As an alternative, the maker 100 may make the electronic check payable to himself or to cash, in which case there is no separate entity designated as the payee 110 (i.e. the maker 100 is also the payee 110) and therefore the maker 100 provides all of the information required to complete and authorize the check 70.

As a further alternative, the maker 100 and the payee may use a third party service 140 to aid in the transaction process, by for example, speeding up the process or by providing an additional level of security or verification of the information used to generate the check 70.

The maker 100 of the check need not be the party that causes the check 70, the partially completed check 30, or the partial image 50 thereof to be printed. The payee 110 or any other party involved in the completion of the check can print or store the image of the check 80, including, but not limited to the deposit bank 120, the paying bank 130, and the third party service 140.

Alternatively, the maker of the check completes the check in full via a computer and then skips the step of printing it onto paper to be conveyed physically to the payee who would then take it to their bank or image it and transmit it to their bank. The maker can generate an image directly from the computer application used to composite the check and then the maker can forward the check image to the payee who can then print it and deliver it to their bank or forward the image on to their bank. In either event, it will be understood that the invention contemplates presentment of the transaction record to a processing institution, such as a bank, in either tangible (e.g., a physical, printed document) or electronic form.

The maker may after completing the compositing of the check, send the some but not all the data elements together with a unique reference value designating a location where the omitted elements are stored thereby allowing the maker or a third party service to reconstitute the check exactly as it had existed at the time of its original authorization.

The maker 100 of the check composes the check by inputting into a computer all the information needed to draft an ordinary check, adding a signature (a recorded instance of the regular wet signature, or a signature generated by a signature pad, or an electronic signature (per ESIGN & UETA) or digital signature (per PKI)). The check information can be a set of data objects and the check form can be a graphic object, set of graphic object instructions or image and the two are sent together such that the informational elements map to specific (and appropriate) designated areas (locations) on the check form object.

The two elements (information and check-form) can be sent as a bundle. The information can be sent by itself with the intention that the receiving party (the payee) associate it with an appropriate check-form and create a composite item which they then print, or image or forward on to their bank/financial institution to deposit.

Alternatively, the maker of the check could create the composite item and cause it to be imaged (i.e., Check 21 or RDC guidelines) and then forward this on to the payee. The intended payee can initiate the process by sending check information -- the payee, and/or amount, and/or any other relevant information (i.e., date, memo, etc.) to the maker for the maker to complete by adding the bank routing number, account number, and/or check number, and optionally the date and/or memo (or any other missing information) and then the maker authorizes the check and evidences same by any of the herein mentioned methods of adding a signature. The maker and the payee can work back and forth as needed in any combination of who adds what information or edits the information until the point that the maker is satisfied and authorizes the check.

Another example to transfer the payment authority and data would be an interaction between mobile devices. For example, a pair of handheld devices could be loaded with cooperating applications so that a maker 100 could construct a payment and a payee 110 could receive the payment on their handheld device by cellular network, wireless or local proximity interaction, such as Bluetooth protocol.

Alternatively, the maker could do all of the requisite steps disclosed above and leave the payee blank such that it could be completed later by the payee or it could be left blank and the item traded as if it were a form of currency with the ability for any legitimate holder to add a name as the payee and then cash it or deposit it or use it to acquire goods in trade (similar in nature to how a gift card or a traveler's check works), the difference being that the funds would not leave the maker's account until it is converted to cash, goods or deposited with a bank/financial institution.

Figure 3A:
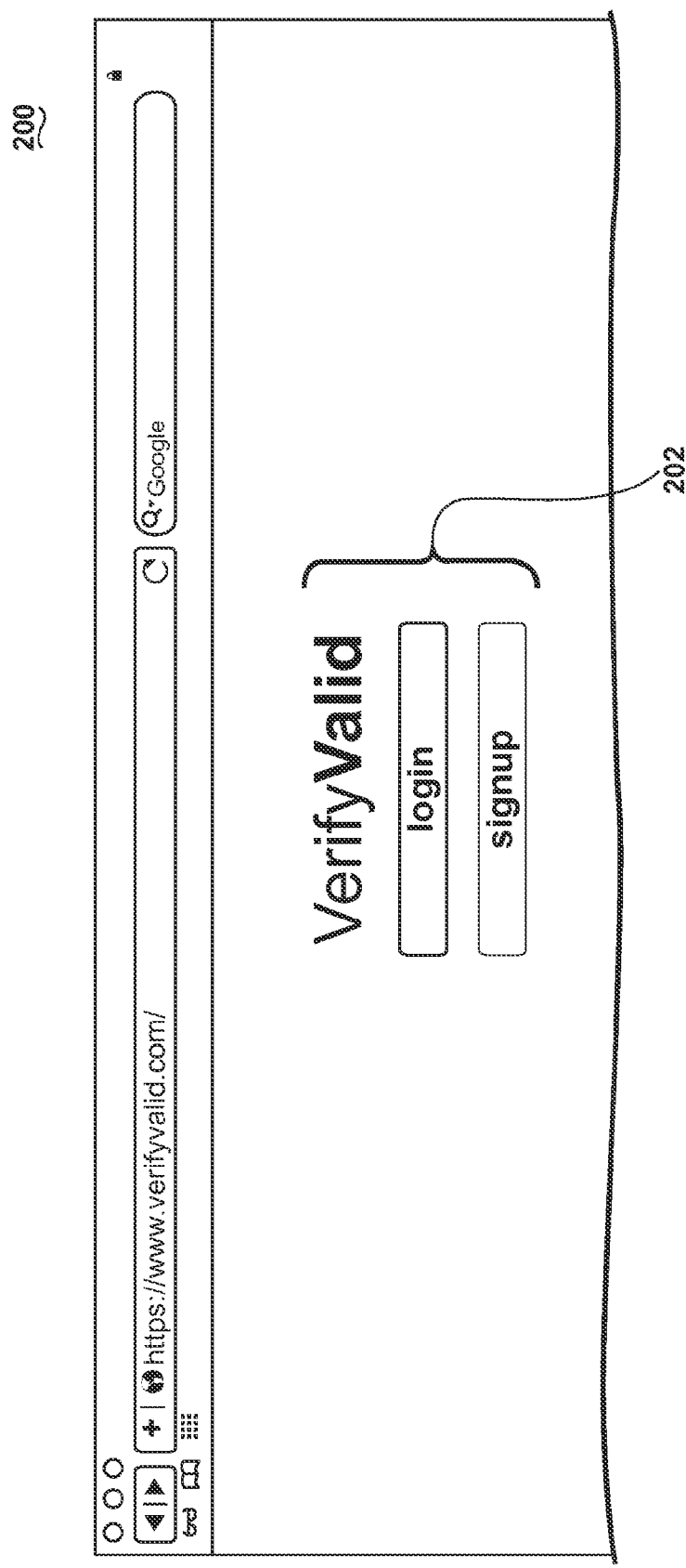
FIG. 3A is an example of the web interface contemplated for the invention including an initial screen.
Figure 3B:
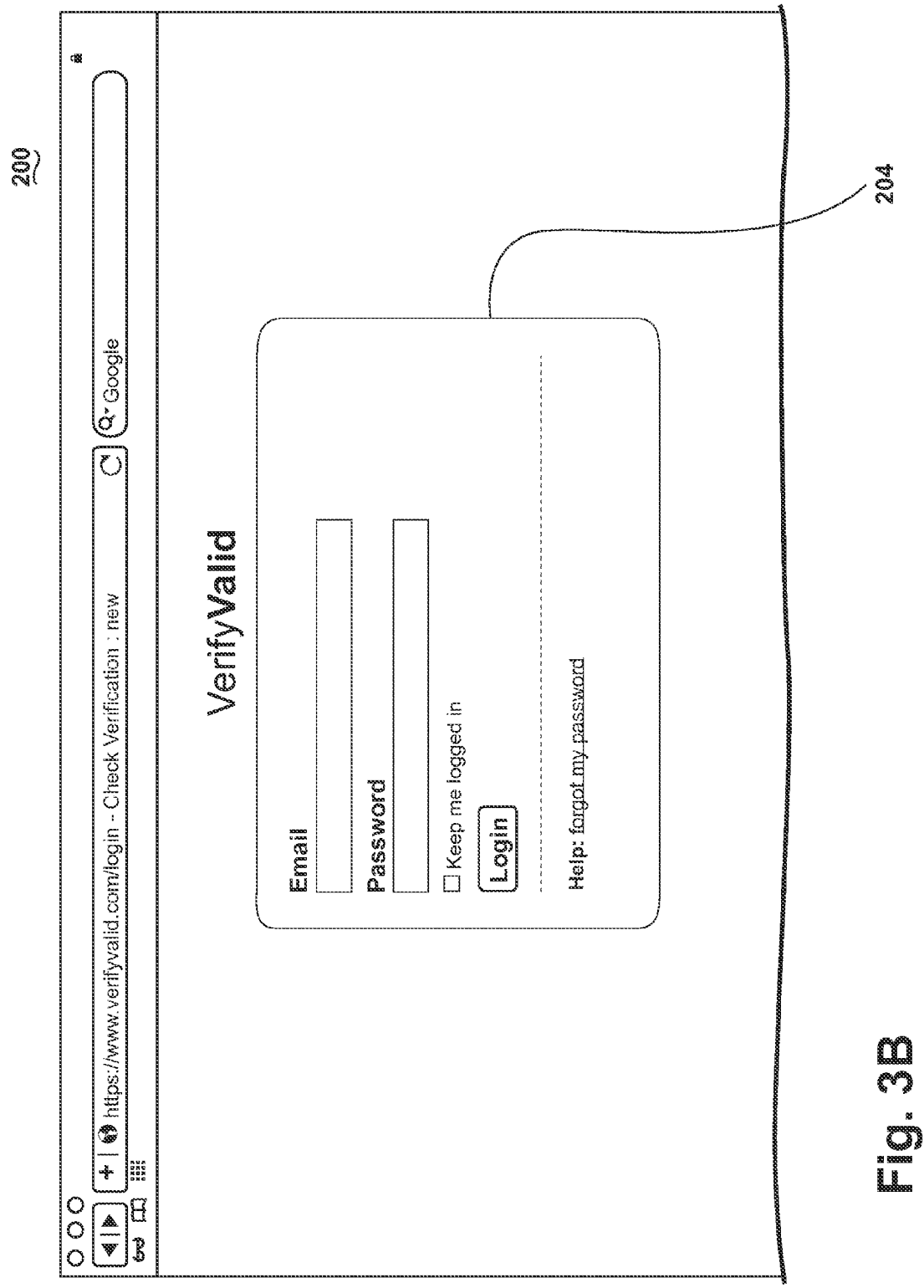
FIG. 3B is an example of the web interface containing a login form according to the invention.
Figure 3C:
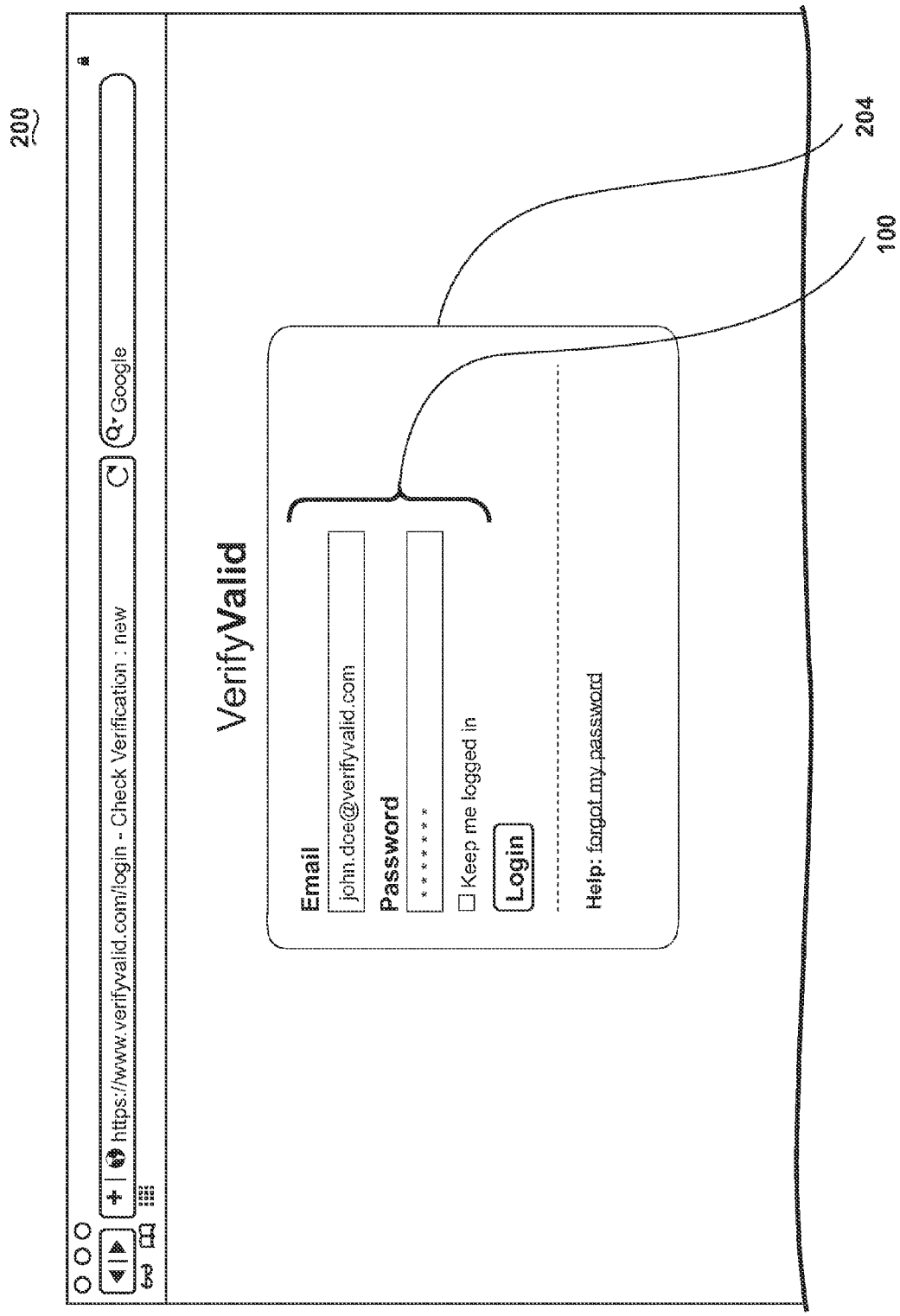
FIG. 3C is a completed login form for the web interface.
Figure 3D:
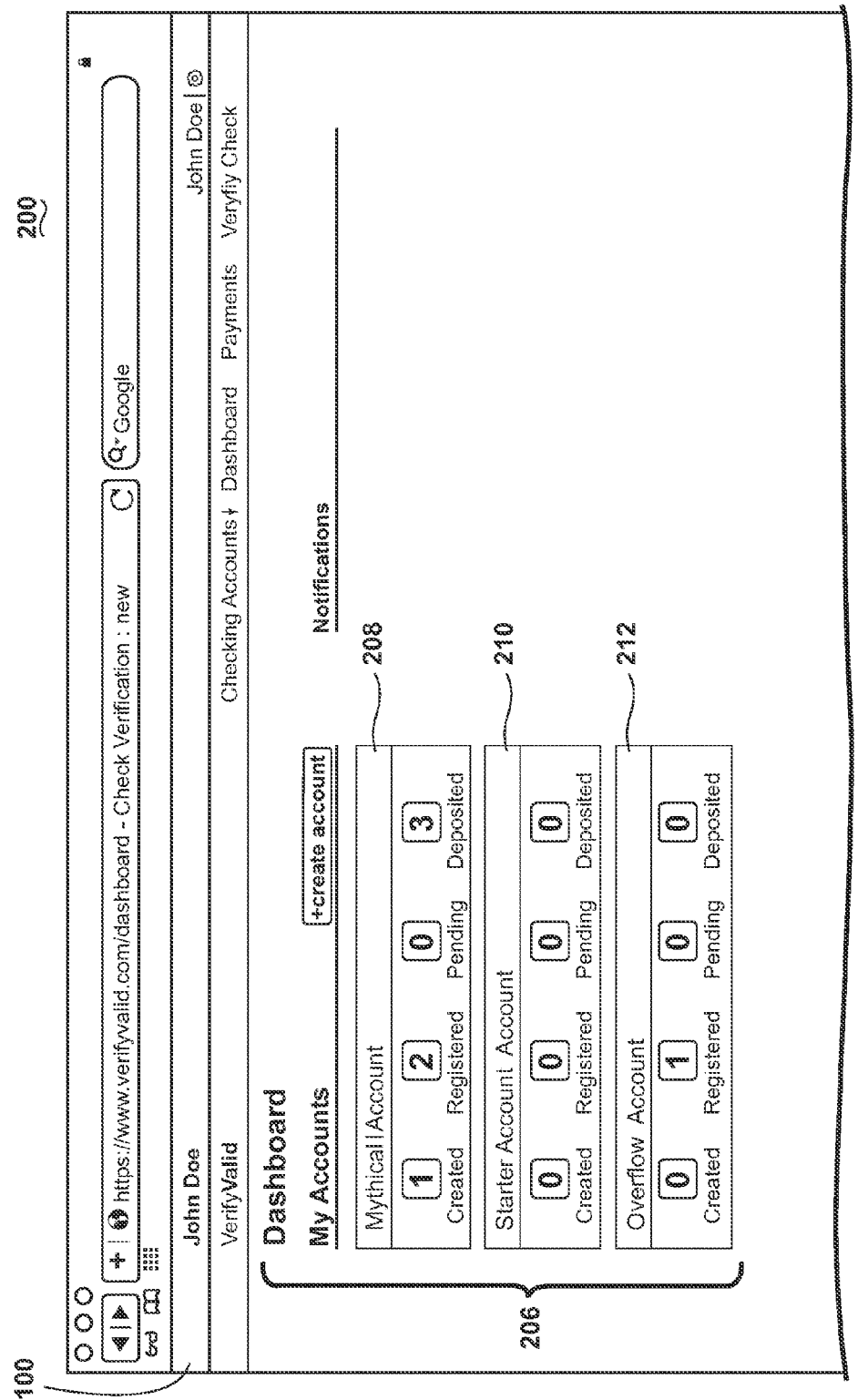
FIG. 3D is a dashboard for the web interface showing various information for a logged-in user.
Figure 3E:
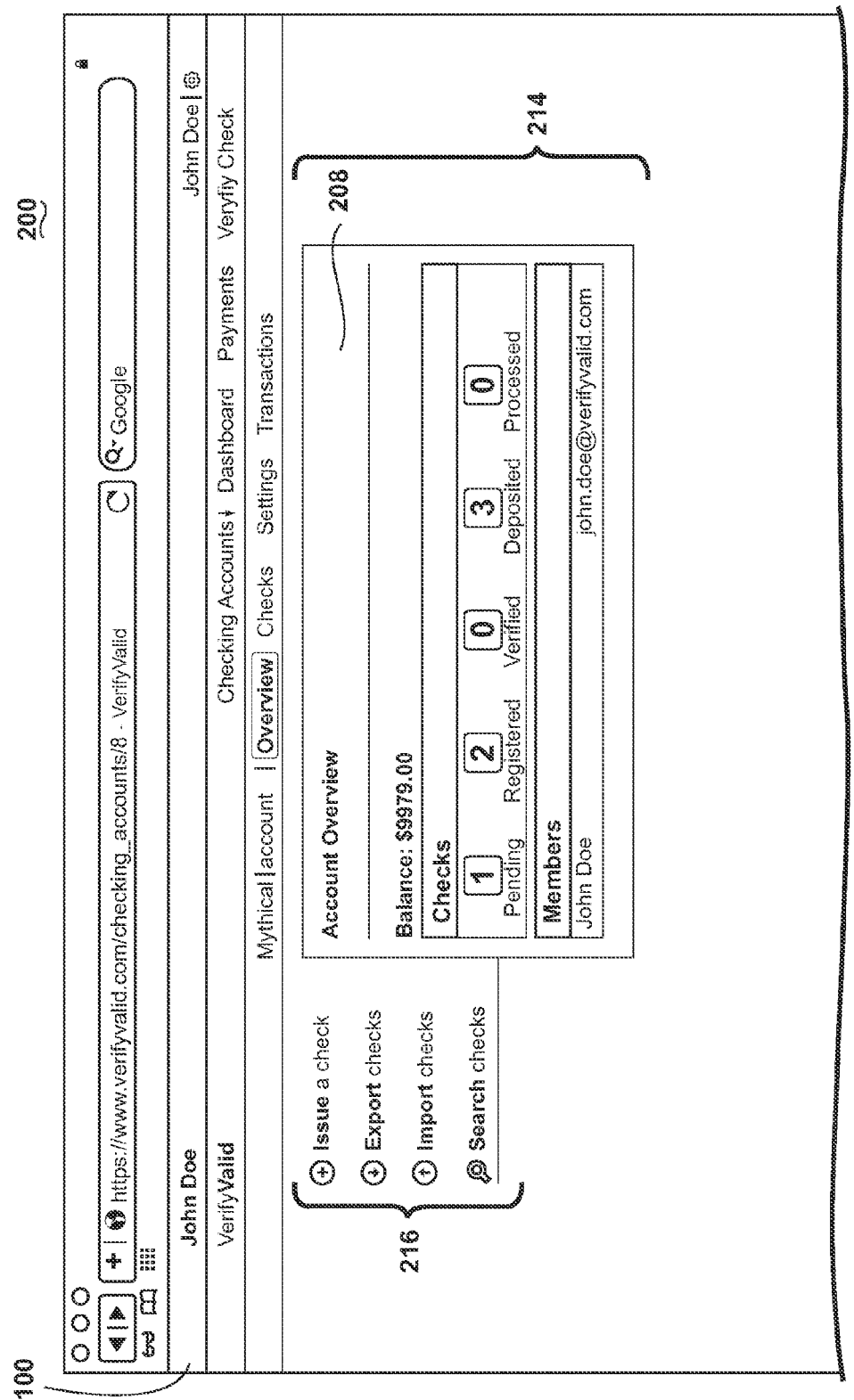
FIG. 3E is a bank account overview for the web interface showing the status of various checks drafted on a selected account.
Figure 3F:
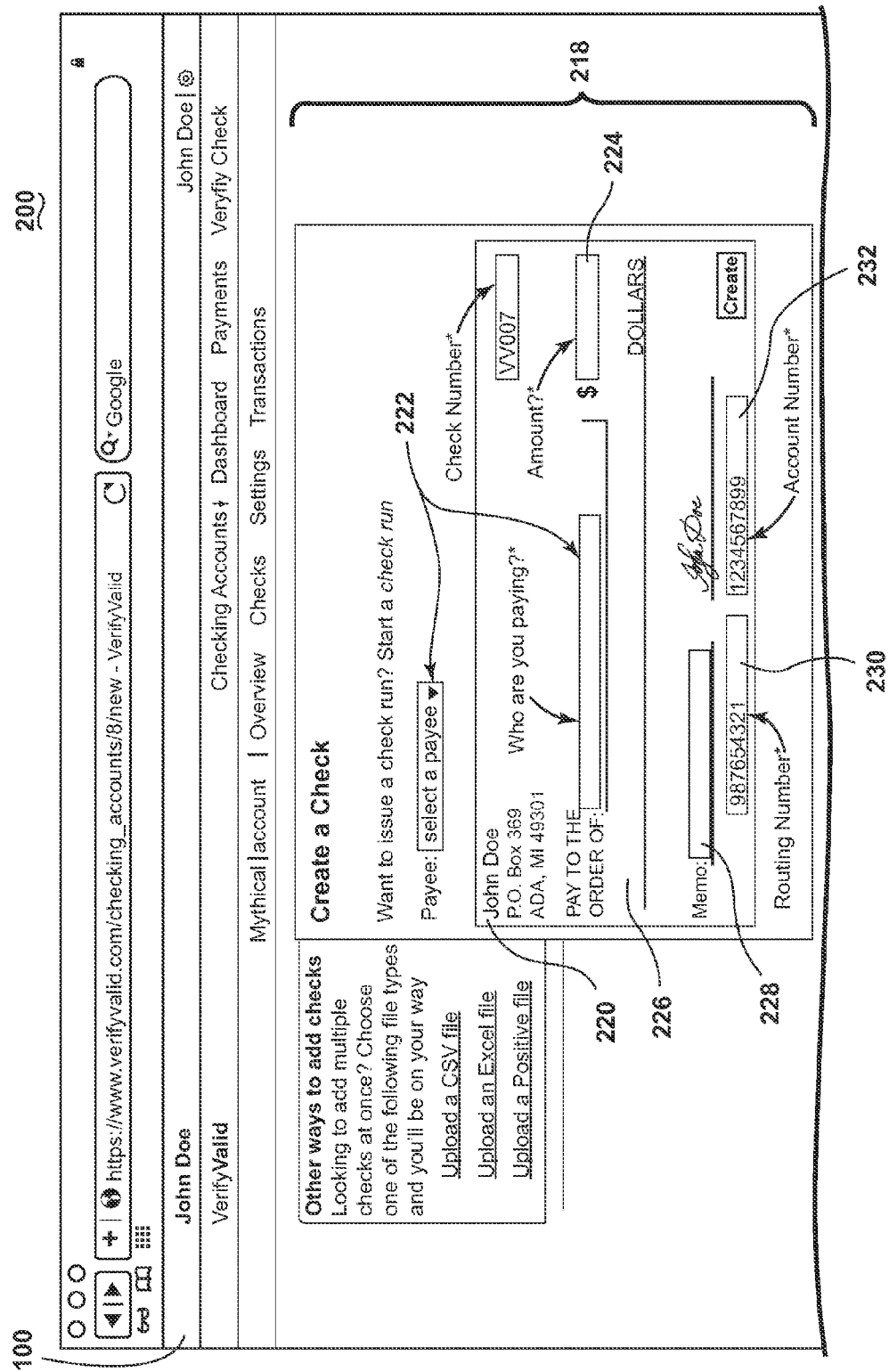
FIG. 3F is an initial form for the web interface for creating an electronic check transaction.
Figure 3G:
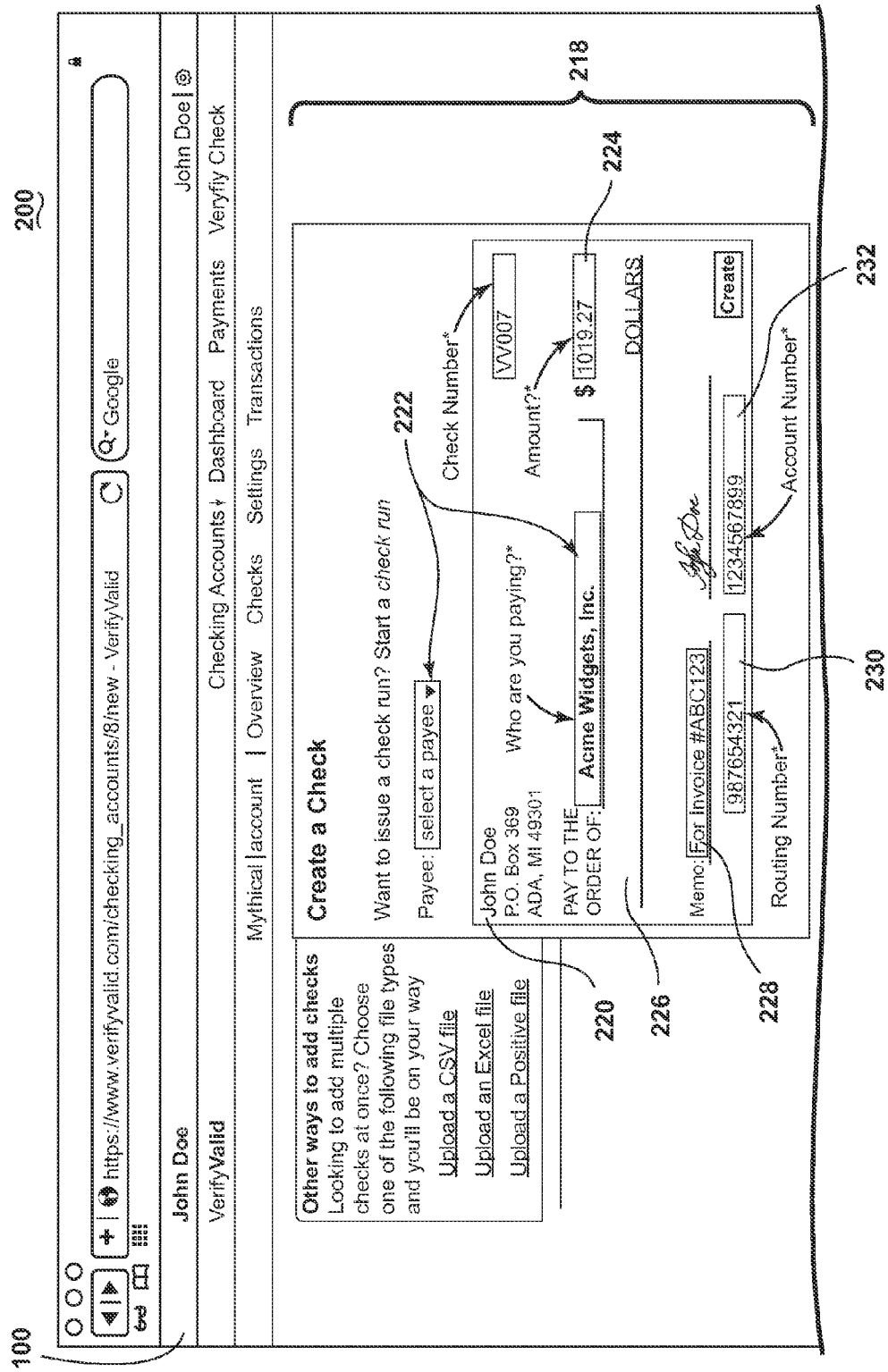
FIG. 3G is a completed form for creating a data record representative of a physical check in the web interface.
Figure 3H:
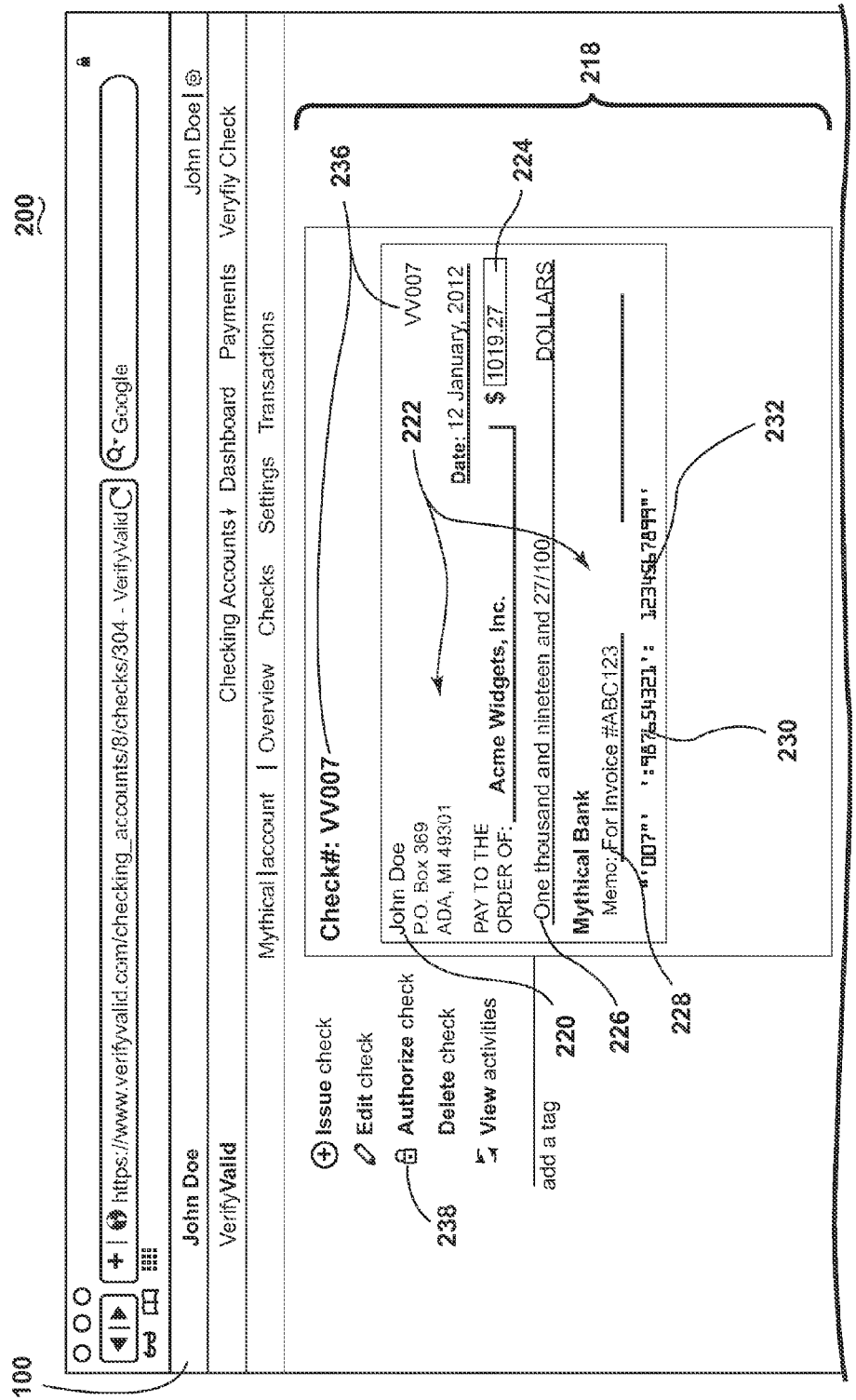
FIG. 3H is a graphical representative of a check incorporating financial data entered by the maker in the web interface.
Figure 31:
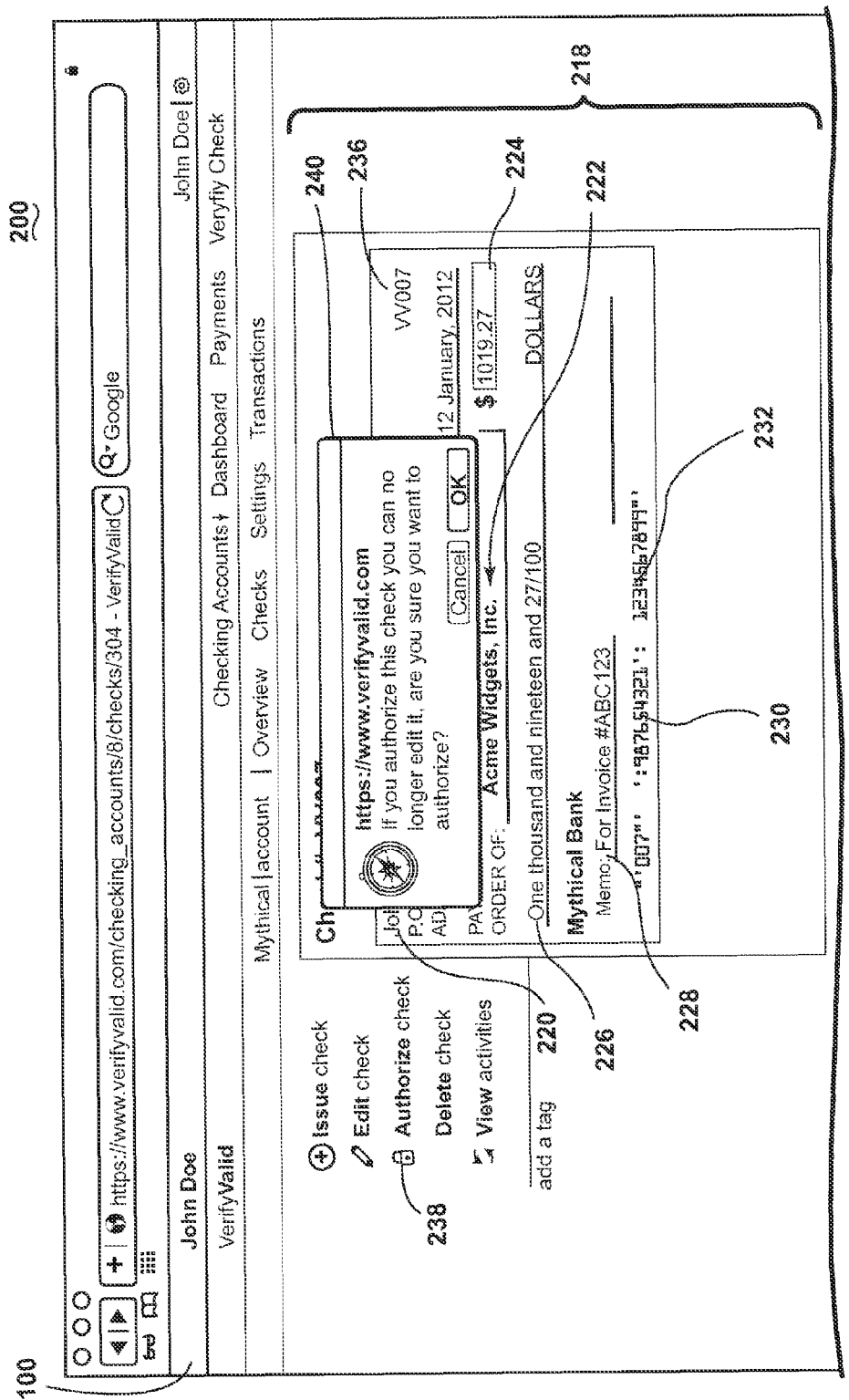
Figure 3J:
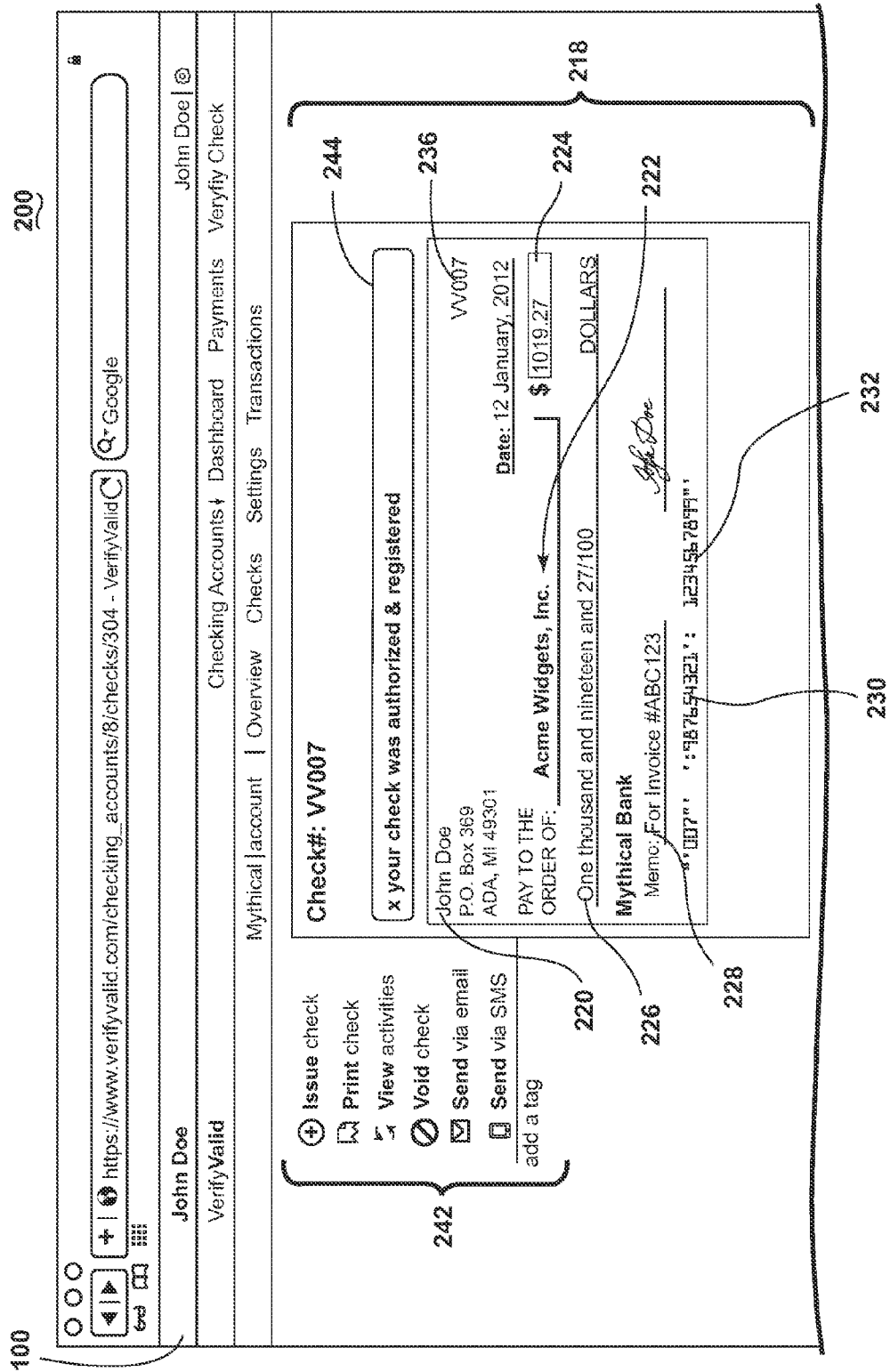
FIG. 3J is a message indicating that the check data was authorized and registered in the web interface.
Figure 3K:
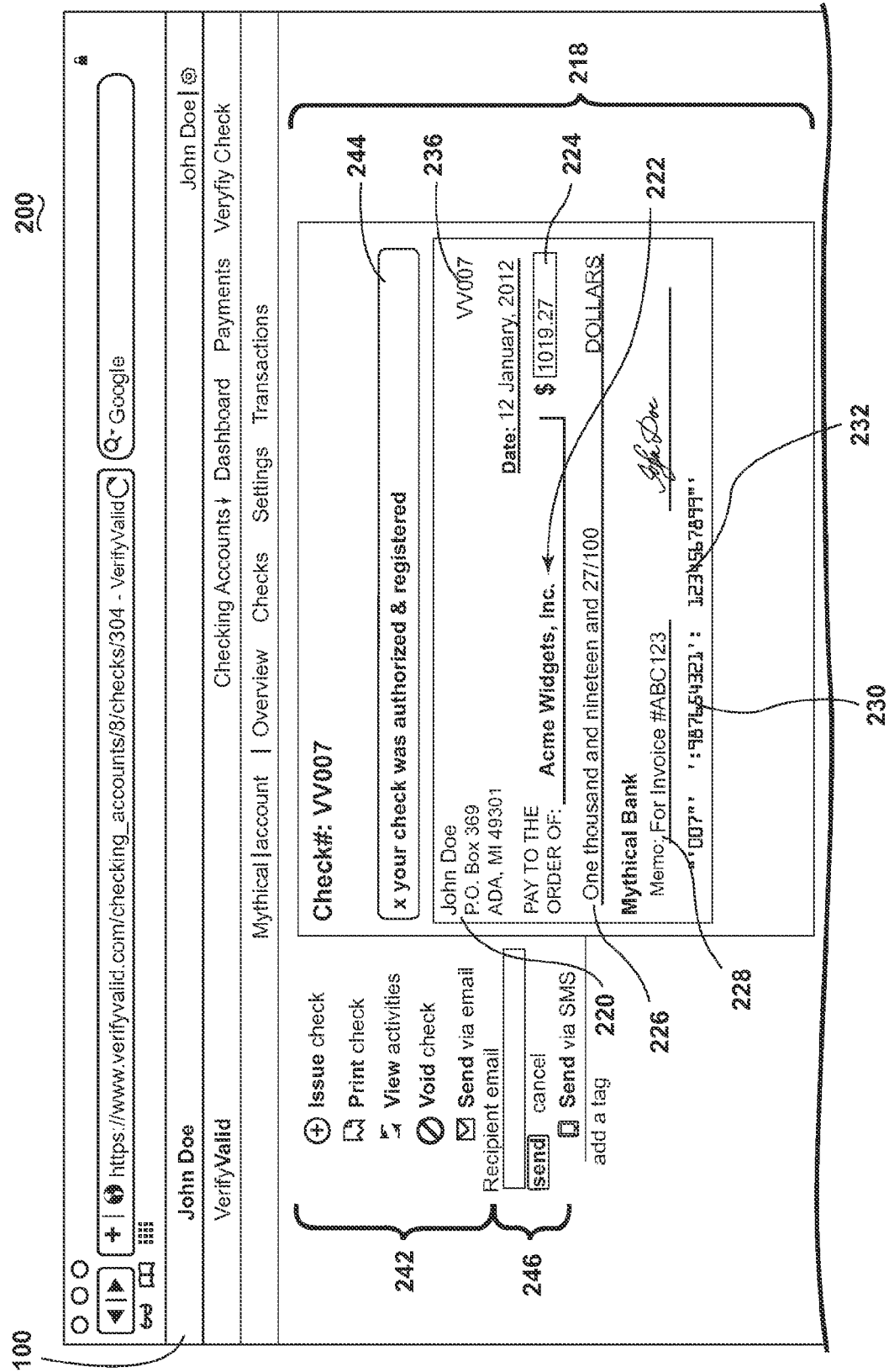
FIG. 3K is a web interface prompting the logged-in user for recipient e-mail information for sending the authorized check transaction to a payee.
Figure 3L:
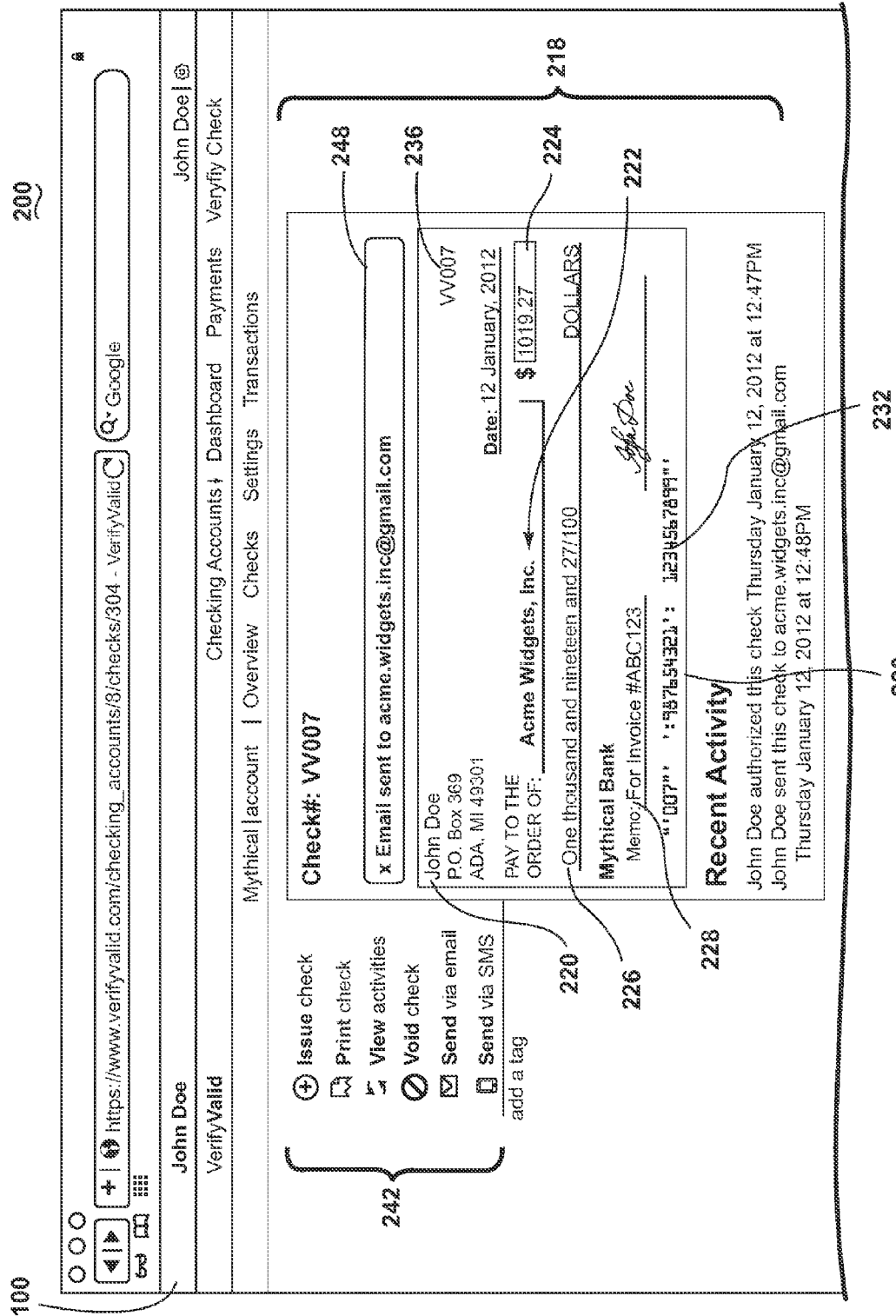
FIG. 3L is a confirmation message provided to the logged-in user that the check transaction was e-mailed to the indicated payee.
Figure 3M:
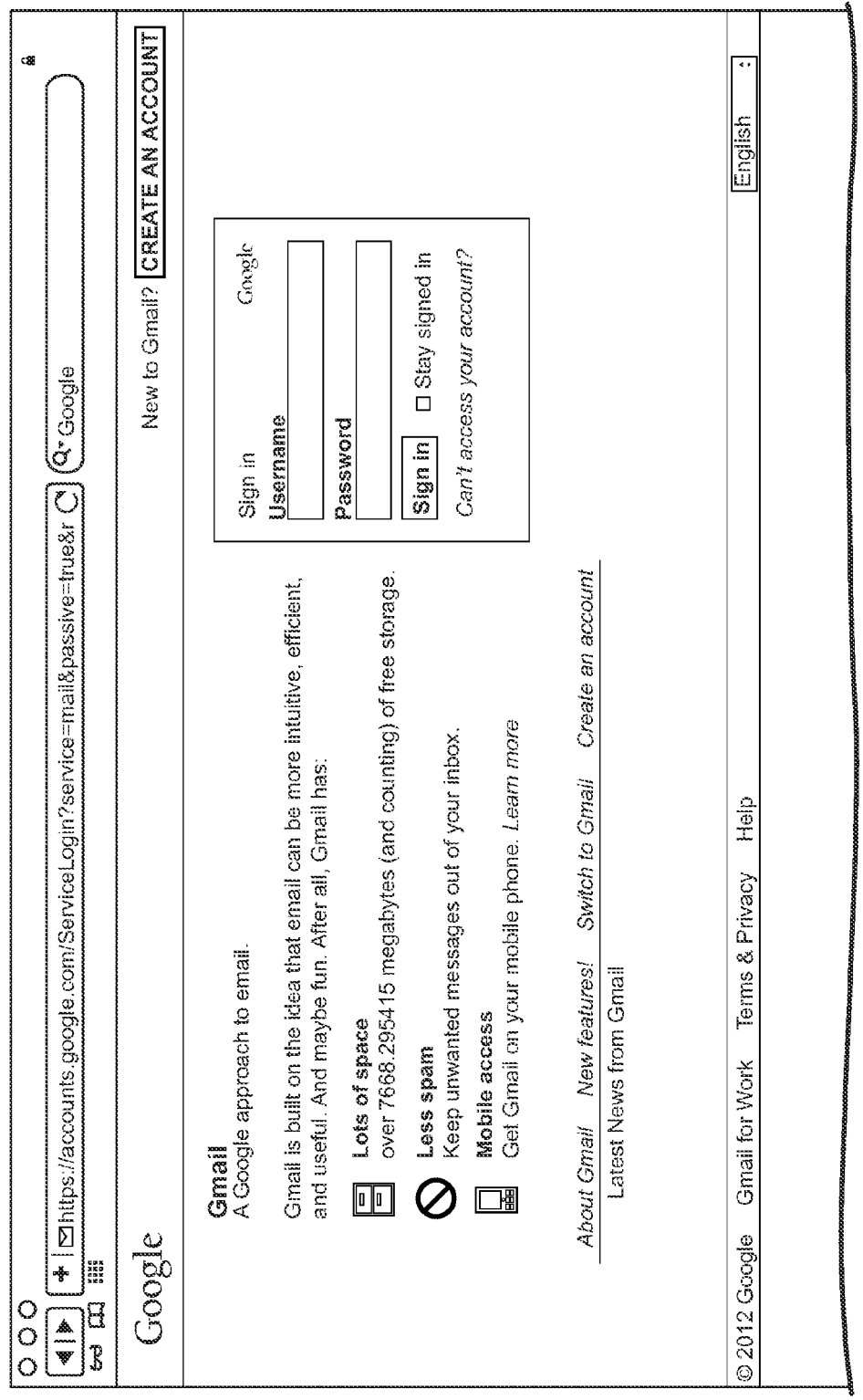
FIG. 3M is a sample login interface for a web-based e-mail provider for a payee which has received the e-mail check transaction from the maker from the web interface.
Figure 3N:
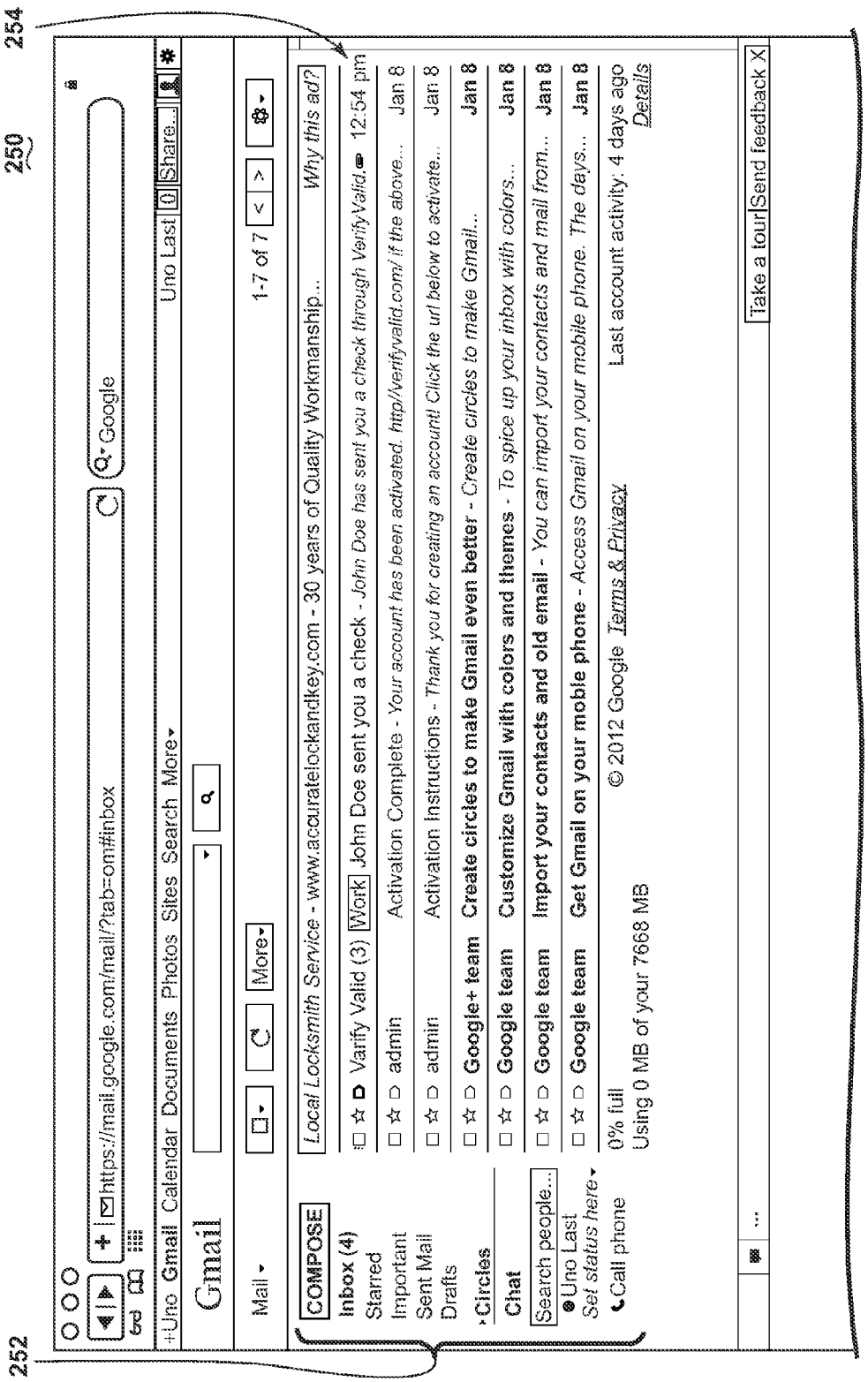
FIG. 3N is a sample e-mail inbox indicating that the e-mail check transaction has been received by the payee's e-mail account.
Figure 30:
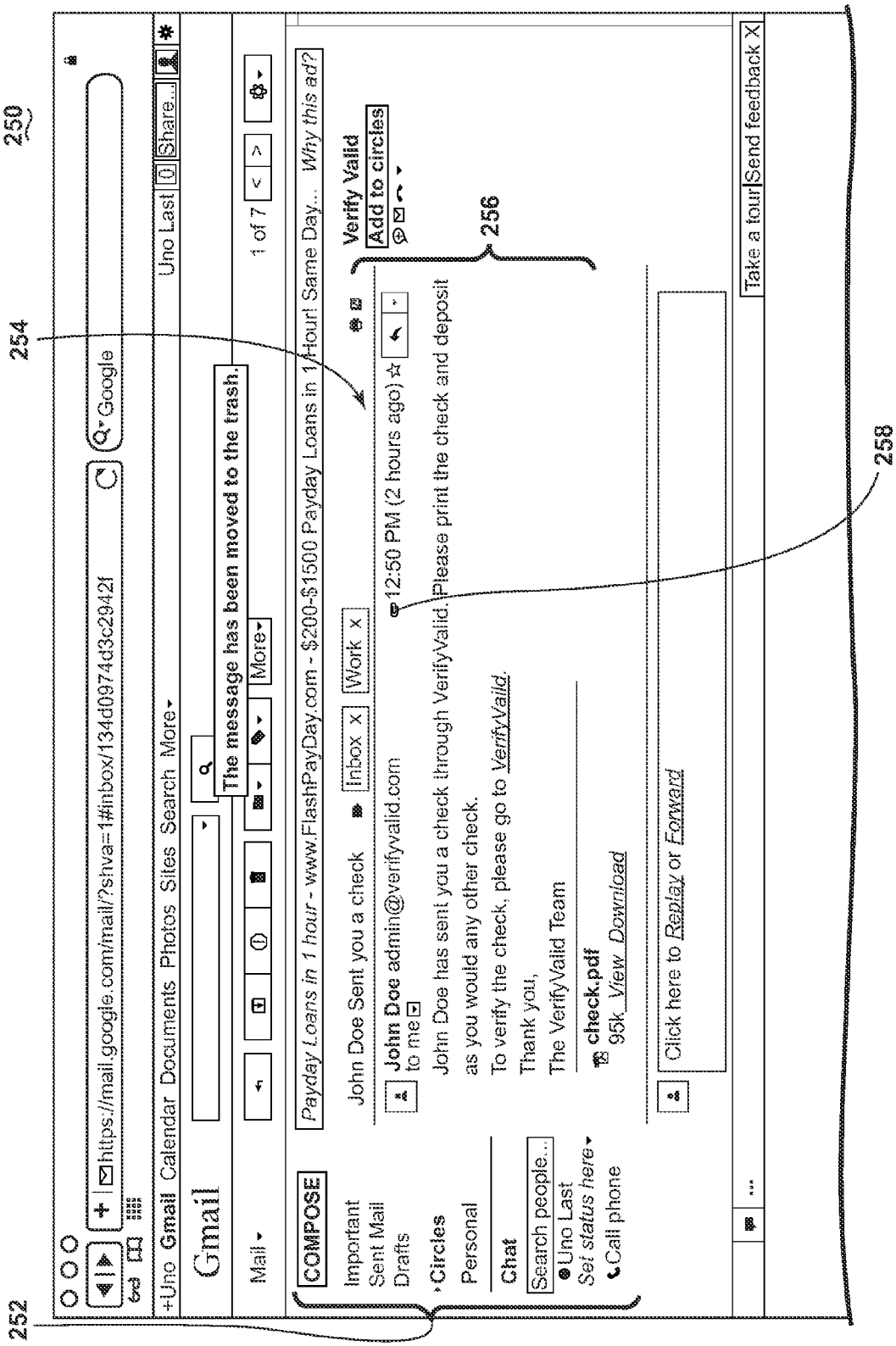
Figure 3P:
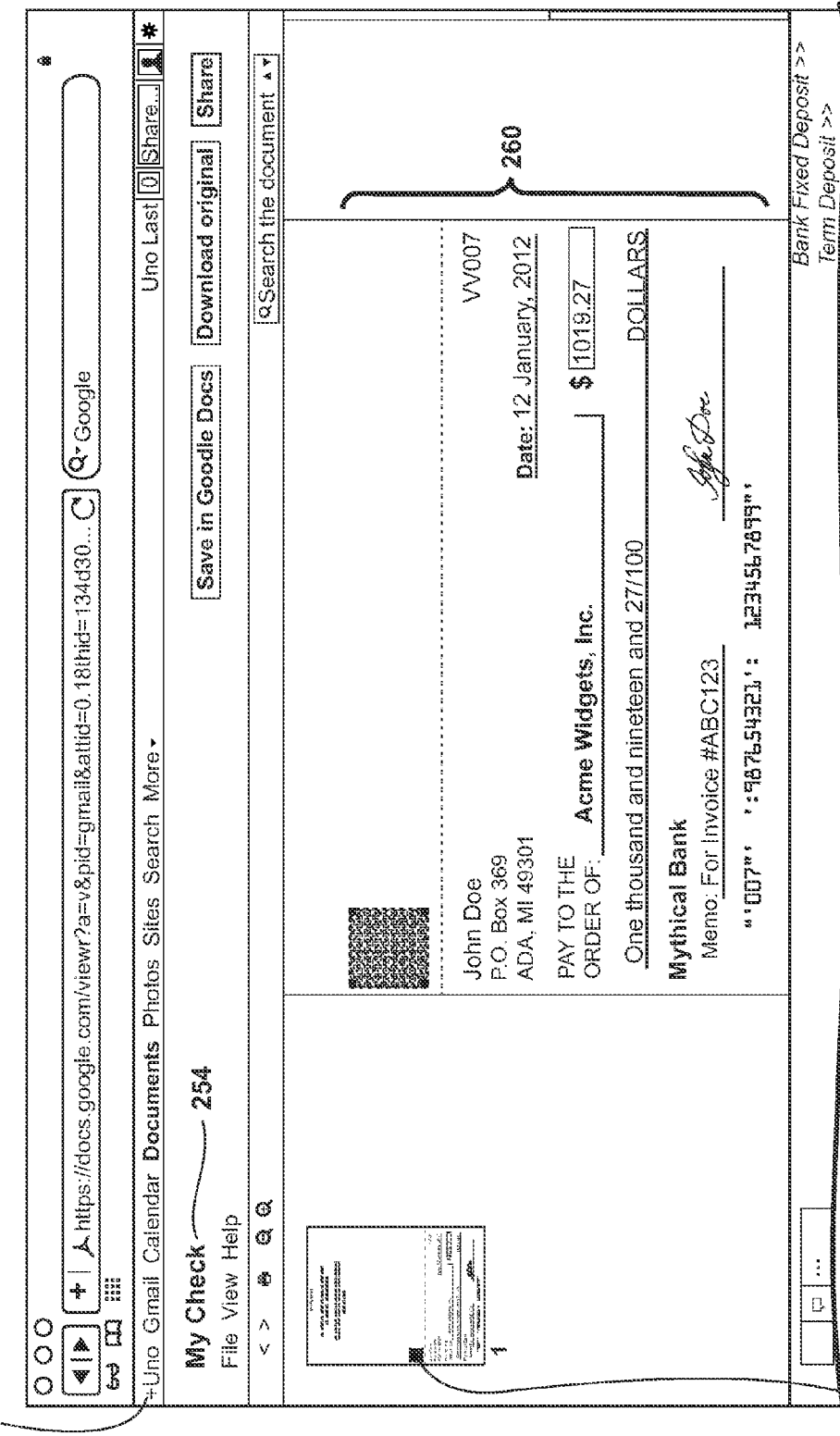
FIG. 3P is the contents of an e-mail attachment containing a graphical representation of a paper check received by the payees e-mail account.

An example website for performing all steps relating to creating, authorizing, completing, and transmitting the data record representative of the financial transaction by the maker 100 to the payee 110 is illustrated by example in FIGS. 3A-3P. It will be understood that these figures are illustrative, and should not be interpreted as limiting the steps and elements of the appended claims in any way. The examples set out in FIGS. 3A-3P assume that the maker has an account created on the example website, shown generally in FIGS. 3A-3P by reference numeral 200 and higher.

FIG. 3A shows an example of the web interface 200 contemplated for the invention including an initial screen 202, prompting a client to either login or sign up. FIG. 3B shows a login form 204 for the web interface 200, and FIG. 3C shows a login form 204 completed by a maker 100 on the web interface 200.

FIG. 3D shows a dashboard 206 for the web interface 200 showing various information for a logged-in maker 100. FIG. 3D shows that the example maker 100 has data representative of three bank accounts 208, 210, 212 stored in the interface 200, wherein two of the accounts have one or more checks in various stages of processing.

FIG. 3E shows a bank account overview for one of the example bank accounts 208 for the web interface 200 showing the status of various checks drafted on the selected account, and a balance of that bank account. The account overview includes several menu items 216 for issuing a check, exporting checks, importing checks, and searching checks.

FIG. 3F shows an initial check creation form 218 for the web interface 200 for creating an electronic check transaction when the "issue a check" menu option is clicked by the maker 100 in FIG. 3E. The check creation form 218 includes a graphical representation of a conventional check form document with various fields laid out on the form in a manner consistent with a typical physical check form: maker's name/address 220, payee name 222, amount 224, written-out word representation 226 of the amount 224 (auto completed by the form 218), optional memo field 228, account routing number 230 (auto-completed by the form 218 when the maker 100 selects a bank account), account number 232 (auto-completed by the form 218 when the maker 100 selects a bank account), and a representation of the maker's 100 signature 234 (which can be an accurate representation of the maker's signature by the maker 100 uploading an image file containing a graphical representation of the maker's signature. The maker's signature 234 can also be a electronic signature, including any number of well-known electronic signature methods.

FIG. 3G shows a completed form 218 for creating a data record representative of a physical check in the web interface 200. The data shows a sample payment of $1,019.27 (US dollars) from John Doe's (maker 100) bank account 230/232 (account ending in x899) to Acme Widgets, Inc. (payee 110). It will be understood that, in accordance with the invention, not all of the fields shown in web form 218 need to be completed in order to transmit the initial data record representative of the financial transaction to the payee 110. Rather, the form could only have 1-2 fields completed (such as the payee and bank account), and the partially-completed transaction could be sent to the payee for completion, whereby the transaction, after completion by the payee 110, would be re-routed back to the maker 100 for authorization and indication of authority to deposit the transaction (see FIGS. 7-13 for more examples of these types of partially-complete transactions).

FIG. 3H shows a graphical representative of a confirmation copy check 218 incorporating financial data entered by the maker in the web interface 200. The interface 200 has assigned a check number 236 (in the example shown in FIG. 3H, check #VV007) to the proposed transaction created by the maker 100. The maker 100 can then click the "Authorize check" menu item 238, whereby the maker 100 is prompted with the confirmation message 240 in FIG. 3I. Turning to FIG. 3J, once the maker 100 clicks "OK", the maker 100 is presented with additional transmission options 242, which allow the maker 100 to transmit the check in the form 218 to the payee specified in field 222 via physical check ("Print check"), email ("Send via email"), and text messaging ("Send via SMS"). There are also options to view the activities relating to the check in the form 218 and to void the check in processing ("Void check"). The maker 100 is also presented with a confirmation message 244 that the check in the form 218 "was authorized and registered." Data regarding the check in the form 218 can now be accessed with properly authenticated service calls to a service 140 contemplated by the invention. For example, a bank of first deposit 120 could call the service 140 and obtain verification or validation information on the accuracy of data being presented to the bank of first deposit 120, such as to confirm that the bank account information 230, 232 or the amount 224, or payee's name 220 is accurate with what is being presented to the bank 120.

Once the data record representative of the check transaction 218 has been authorized, processing moves to FIG. 3K in which the maker 100 is prompted for transmission information for the payee 110 (in whatever mode of transmission the maker 100 has selected). In this example, the maker 100 is prompted for email information relating to the payee 110 in email form 246. Once the payee's recipient email is entered into the email form 246, the maker 110 can press the "send" button to transmit data representative of the financial transaction in the form 218 to the payee 110. A confirmation message 248 that the transmission has been sent to the payee 110 is set forth in FIG. 3L.

The receipt of the transmission by the payee 110 will now be described with respect to FIGS. 3M-3P. FIG. 3M shows a sample email interface 250 for a web-based e-mail provider for a payee 110 which has received the e-mail check transaction from the maker 100 from the web interface 200. FIG. 3N shows the email interface 250 with a sample e-mail inbox 252 indicating that the e-mail check transaction 254 has been received by the payee's e-mail account 250. FIG. 3O shows content 256 (and an attachment 258) of the e-mail 254 sent to the payees e-mail account 250 by the maker 100. FIG. 3P shows the attachment 258 and its contents (including instructions for presentment and a link to the service 140 for verification of the check's data) containing a graphical representation of a paper check 260 received by the payees e-mail account 250. The payee 110 can elect now to print the graphical representation of the paper check 260 and present the printed copy to a bank of first deposit 120 or transmit an image of the graphical representation of the paper check 260 to the payee's bank 120.

Alternatively, the maker 100 could do all the requisite steps disclosed above and provide a designated paying bank with a set of the transaction data and evidence of the authorization such that the paying bank could confirm the presence of funds on deposit sufficient to clear the item at time of presentment, potentially providing attestation to the presence of sufficient funds, and reserving an amount from funds being held on deposit sufficient to pay the item when it is eventually presented for payment/settlement, thereby creating a "good funds" transaction.

The above could be implemented with a limited range of approved payees (i.e. a list of individuals or businesses, etc. from which only one of the list may be added at later time. All of the steps described can be executed using a telephone-based, voice-based service, including but not limited to a cellular/mobile network.

There are several examples of how this method 10 could work to transmit a transaction of value between a maker 100 and a payee 110. Illustrative, but not limiting, examples are shown in FIGS. 4-13 (in addition to the example shown in FIG. 3).

FIG. 4 is a flow chart showing the method 10 according to the invention of compositing transaction information and authorizing a transaction in which the maker 100 transmits payment data 20 (as shown by example in the web interface check creation form 218) and maker's authority 22 (a digital signature, imaged signature, text evidencing the authority, etc.) to the payee 110. The payee 110 retransmits the payment data and maker's authority 20, 22 to a bank of first deposit 120, wherein the bank of first deposit 120 converts the payment data 20, 22 into a paper check 120. Processing continues with the payment data 22 converted to a paper check 70 to the paying bank 130.

FIG. 5 shows a flow chart showing the method 10 (having many of the same steps as FIG. 4) in which the bank of first deposit 120 converts the maker's payment data and authorization 20, 22 to a paper check 70 and then images the paper check 70 into a check image 80. Processing continues with the payment data 22 converted to a check image 80 to the paying bank 130.

FIG. 6 shows another example of the method 10 in which the payee 110 forwards the maker's 100 payment data and authorization 20, 22 to the bank of first deposit 120. Processing continues with the payment data and authorization 20, 22 to the paying bank 130.

FIG. 7 shows an example schematic showing a transaction/data record containing value 20, 22 transmitted from a maker 100 to a payee 110. FIG. 8 shows an example schematic of payment data and maker's conditional authority 20, 22 being transmitted from a maker 100 to a payee 110 in which the payment data and maker's conditional authority 20, 22 can include items such as a maker's identification credential, an amount, the payee, a transaction reference, settlement information, authorization, and maker's consent to print the payment data or convert to a settlement mode of the payee's choice.

FIG. 9 shows another example according to the method 10 of a maker 100 composing and fully authorizing a data record representative of a financial transaction, indicating that the data record contains payment data 20 and the maker's conditional authority 22, transmitting the payment data and maker's conditional authority 20, 22 to a payee 110. The payment data and maker's conditional authority 20, 22 can include maker's identification credential, an amount, a payee, a transaction reference, settlement information, authorization, and maker's consent to print the payment data or to convert to a settlement mode of the payee's choice, to the payee 110.

Figure 10:
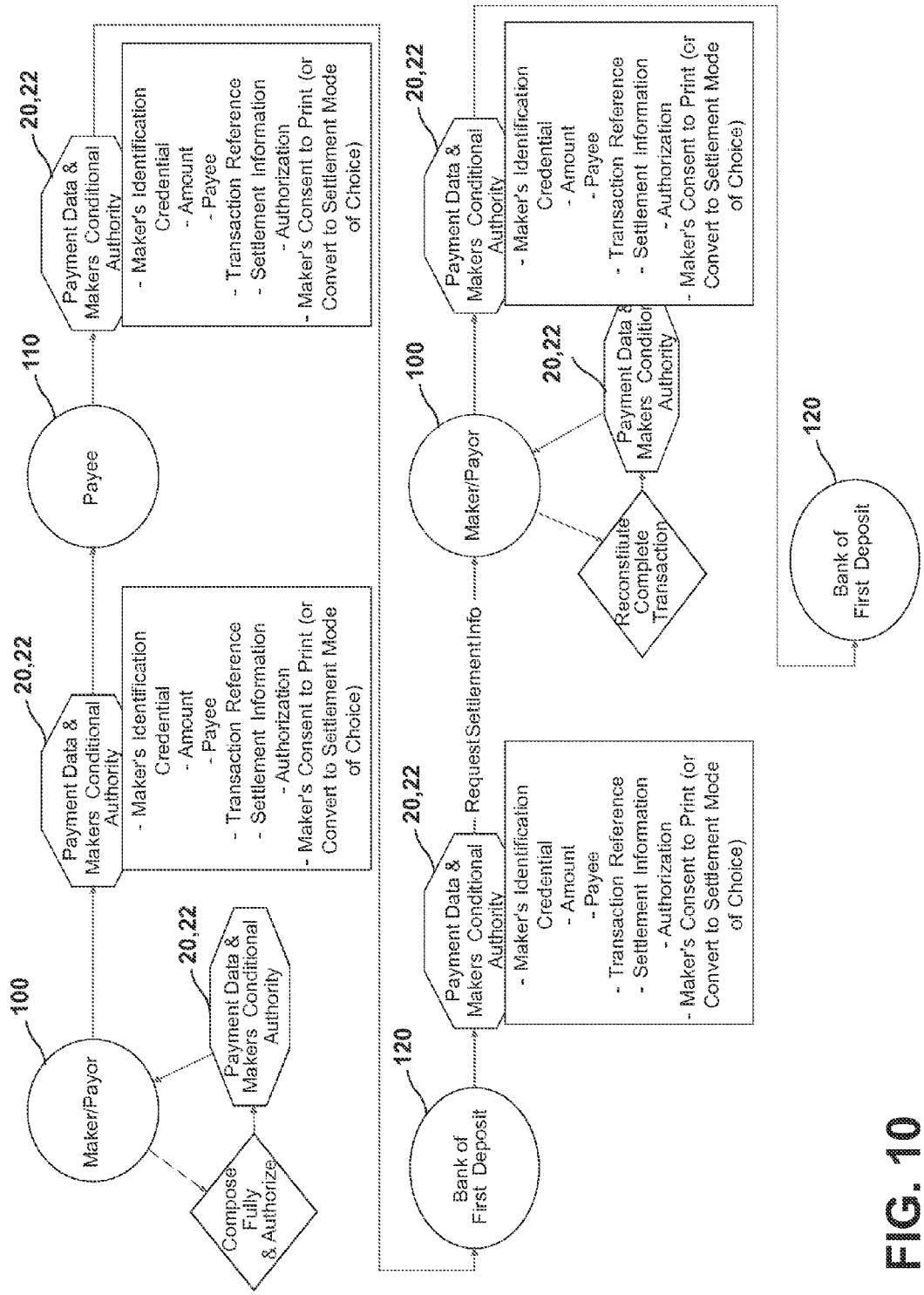
FIG. 10 is an exemplary schematic similar to that shown in FIG. 9 in which the payment data and maker's conditional authority are transmitted from the maker to the payee and then transmitted by the payee to the bank of first deposit when indicating the settlement mode of choice by the payee, and then the bank of first deposit requests settlement information from the maker who re-constitutes the complete transaction and sends the payment data and maker's conditional authority to answer the request for settlement information by the bank of first deposit.

FIG. 10 illustrates a continuation of the example shown in FIG. 9 in which the payment data and authority 20, 22 of the maker 100 are transmitted by the payee 110 to a bank of first deposit 120. In this example, the bank of first deposit 120 contacts the maker 100 and re-routes a request for verification or authorization of the transaction data 20, 22 to the maker 100. Once maker 100 has provided the proper indication to the bank of first deposit 120, processing of the transaction (payment to payee 110) will continue to the paying bank 130 as has been previously described.

Figure 11:
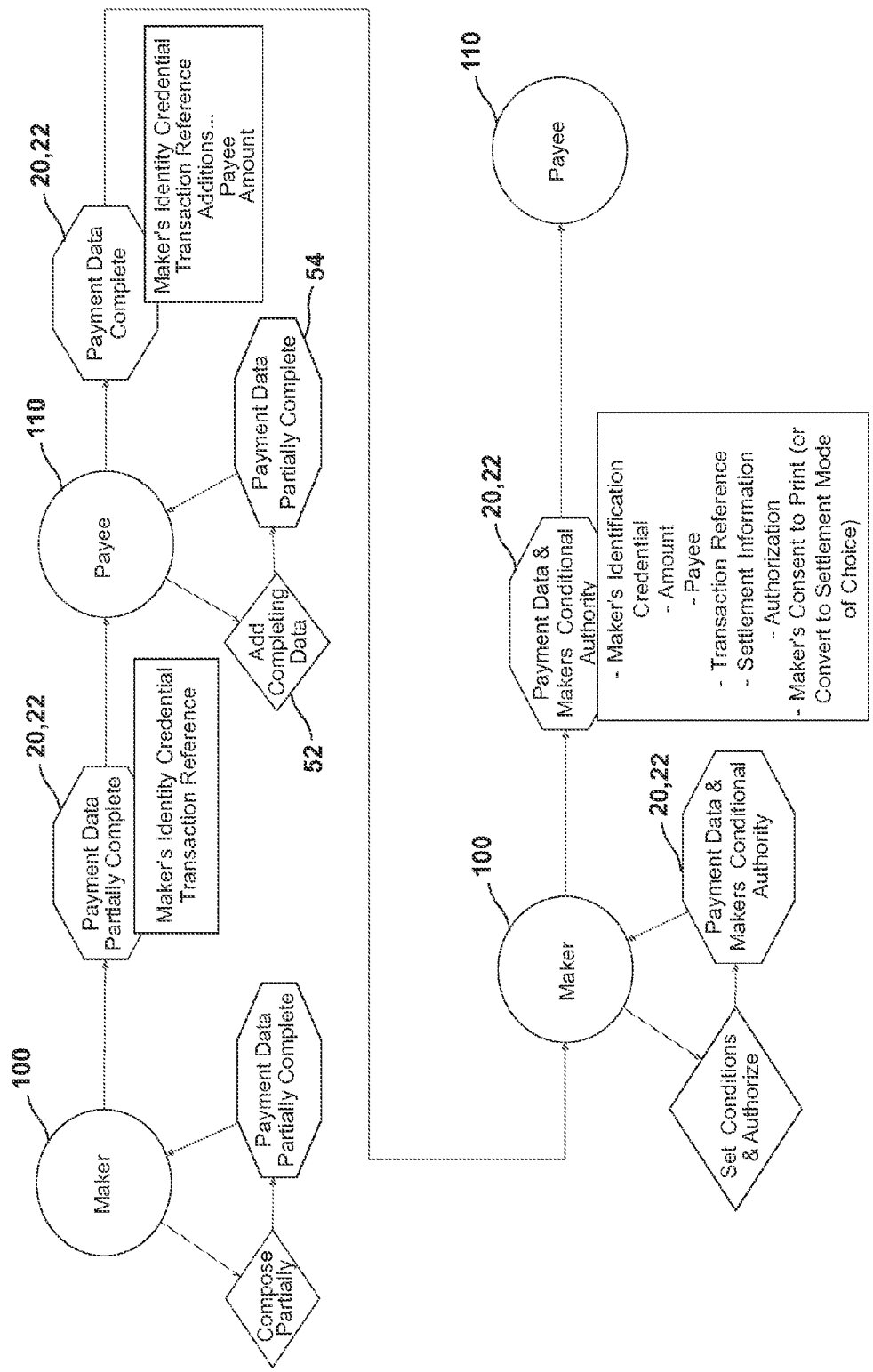
FIG. 11 illustrates another example of the invention of FIGS. 1-10 in which the maker transmits a partially complete set of payment data to the payee, who then adds additional information to the payment record and thus transmits the complete payment record back to the maker who may then set conditions and authorize the transaction, and then the maker retransmits a complete set of payment data in the maker's conditional authority to the payee.
Figure 12:
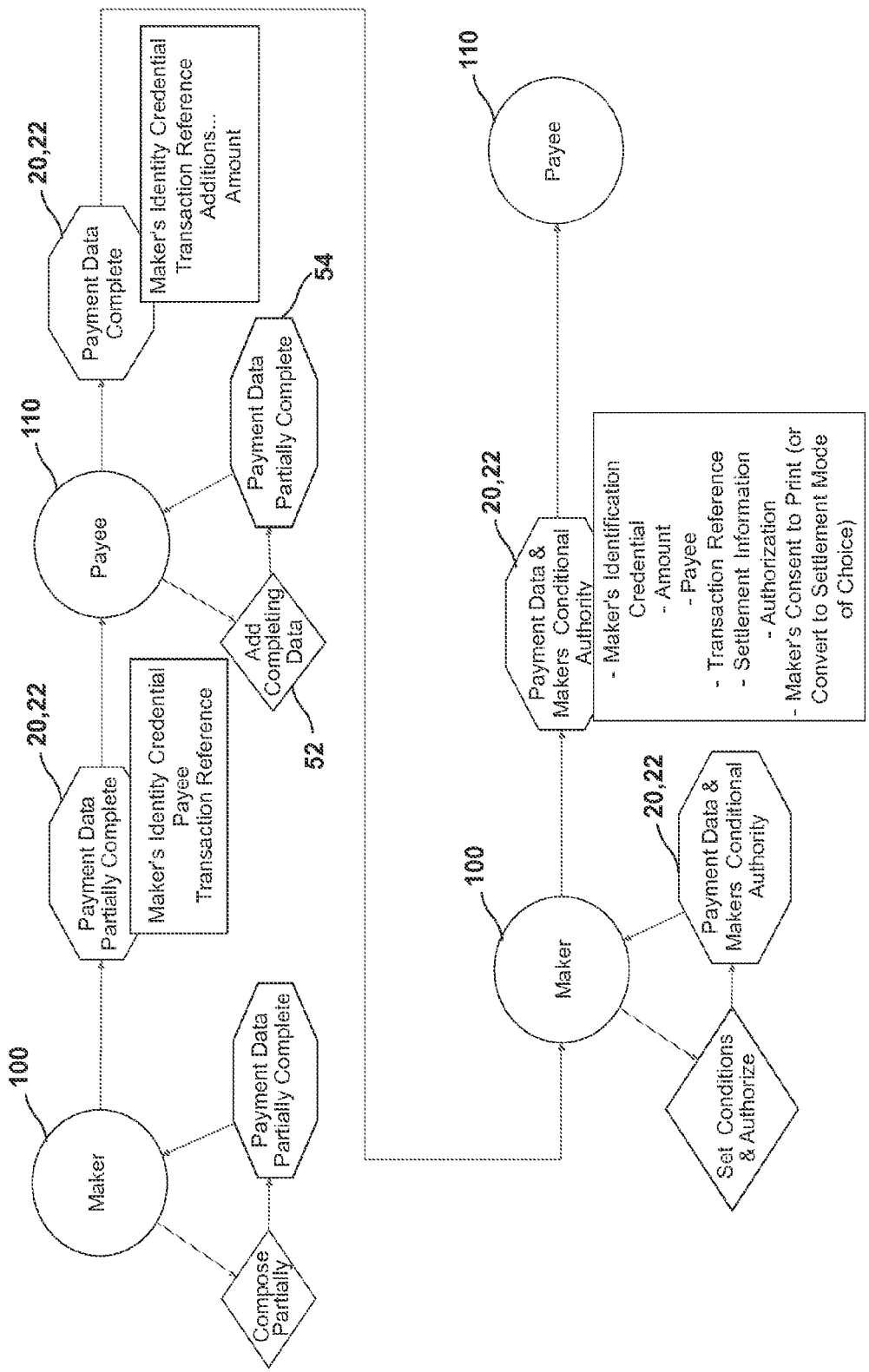
FIG. 12 represents the maker composing a partially complete set of financial transaction information and transmitting the partially-complete set of payment data including the maker's identity credential, the payee, and a transaction reference, to the payee who then adds completing data to create a more-complete set of payment data the maker, wherein the payee retransmits the partially complete set payment data including an amount criterion (or other additional information) back to the maker who sets conditions, authorizes the transaction, and retransmits the payment data and maker's conditional authority to the payee.
Figure 13:
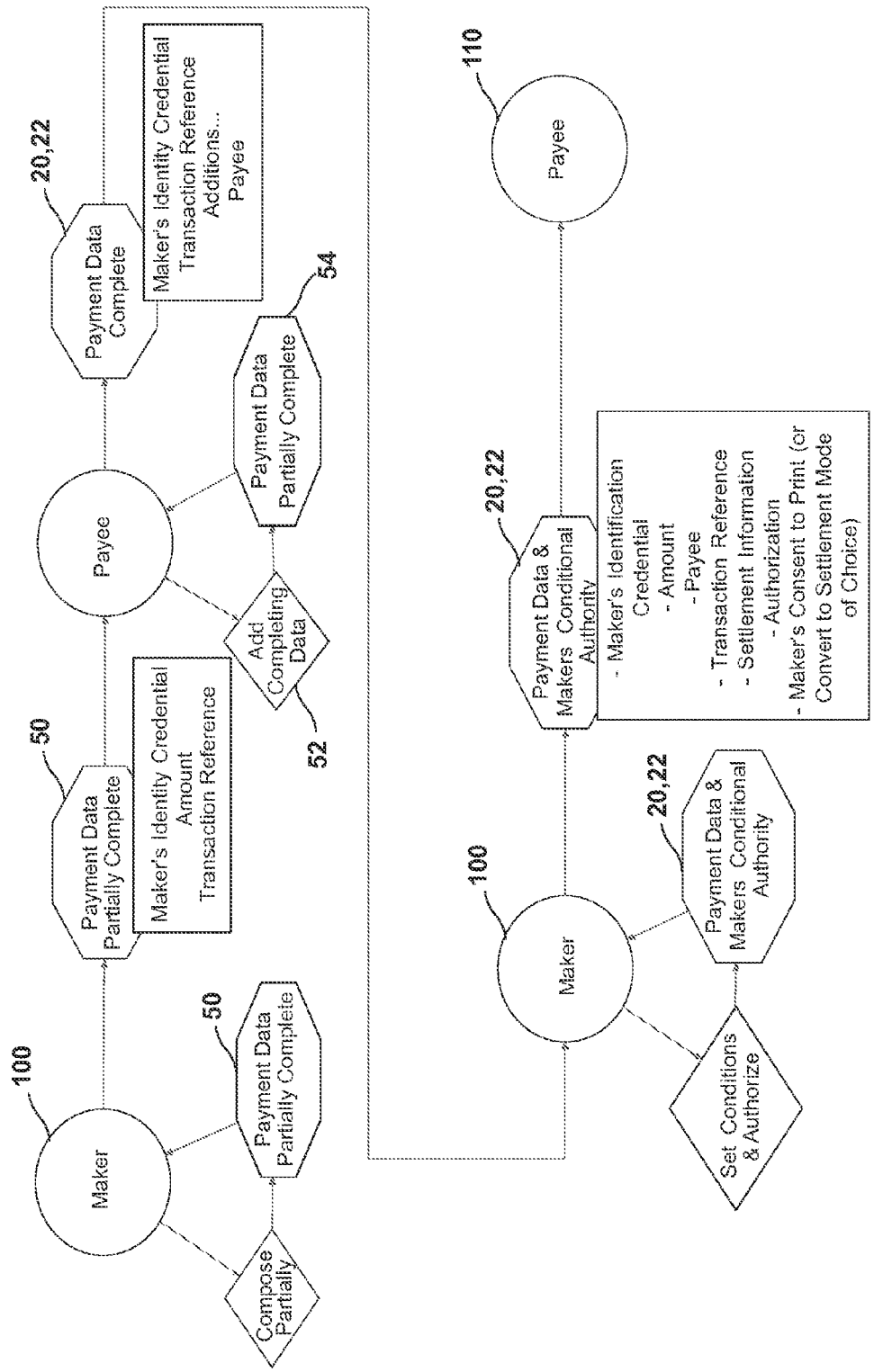
FIG. 13 indicates another example of the partially-complete payment information component of the invention in which the payee adds completing data to a partially complete payment record transmitted from the maker and that the maker pay or adds additional authorization and conditions upon the payment and retransmits a more complete set payment data conditional authority to the payee.

FIGS. 11-13 show examples of the maker 100 transmitting a partially-complete transaction data record 50 to the payee. In each of FIGS. 11-13, the payee 110, upon receipt of the partially-complete transaction 50, provides some completion information 54. In the various embodiments, the completed information 54 is transmitted back to the maker 100. In the example of FIG. 11, the missing information provided by the payee 110 is the payee name and the amount. In the example of FIG. 12, the missing information 54 provided by the payee 110 is the amount of the transaction. In the example of FIG. 13, the missing information 54 provided by the payee 110 is the payee. In any event, the transaction data 20 with the missing information 54 is re-routed back to the maker 100 so that the maker 100 can set optional conditions on, and authorize, the transaction. The maker 100 can then re-transmit the completed payment record and authority 20, 22 back to the payee 110, and processing continues as illustrated with respect to any of the previous examples in FIGS. 3-10.

Figure 14:
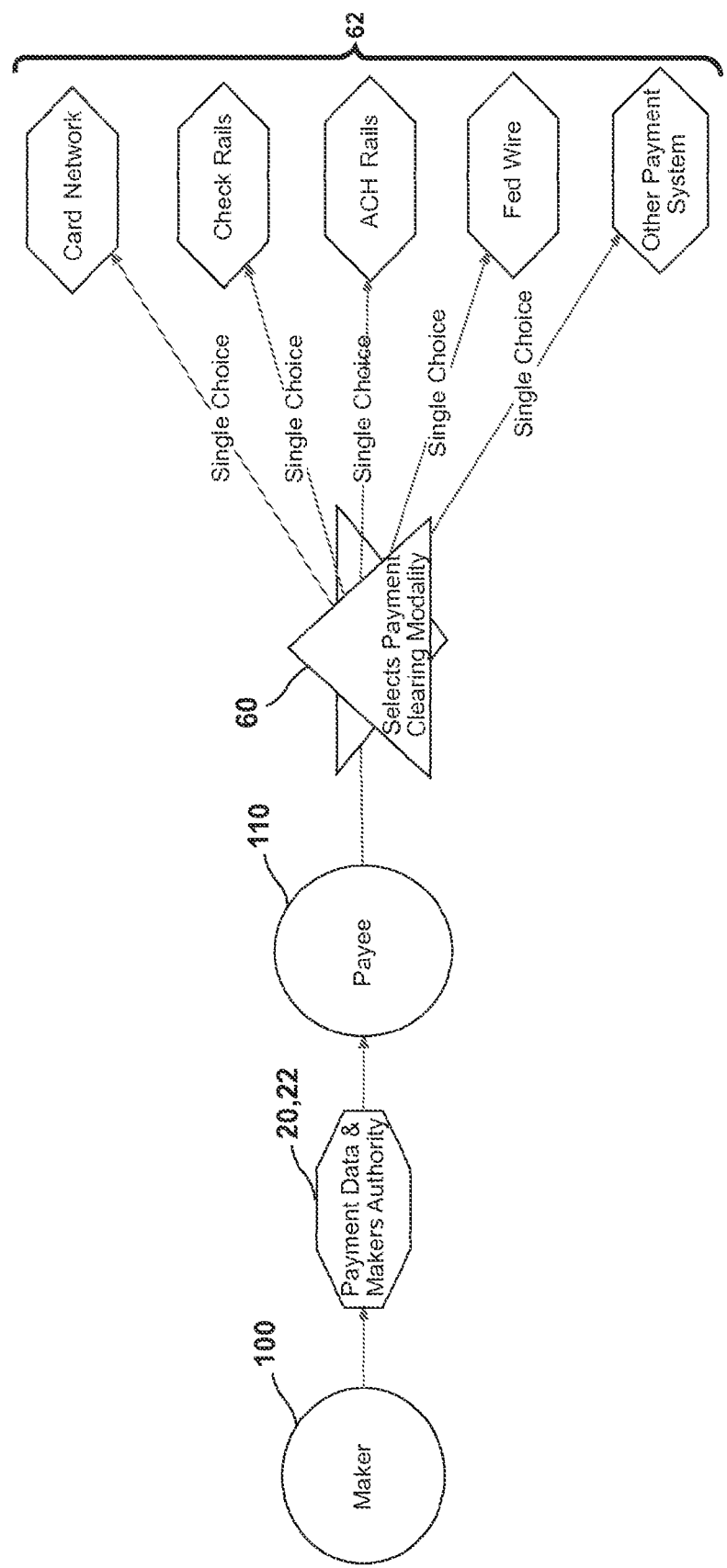
FIG. 14 indicates another example of the system and method according to the invention, in which the maker can set a range of payment settlement types, which can thereafter be elected by the payee.
Figure 15:
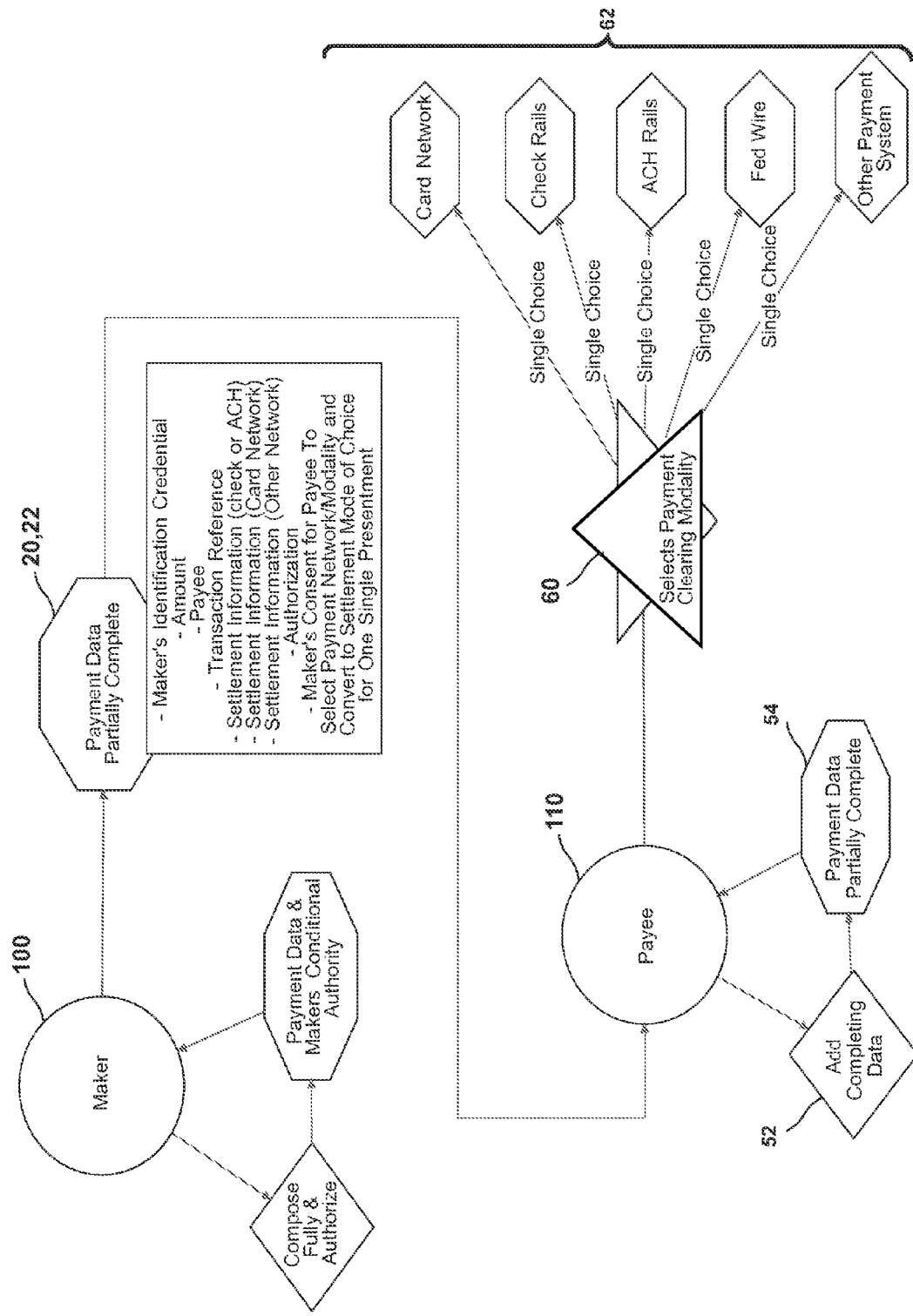
FIG. 15 shows an alternative example of the method shown in FIG. 14 in which the maker can send a partially-complete transaction record to a payee who can thereafter select from a number of payment settlement options.
Figure 16:
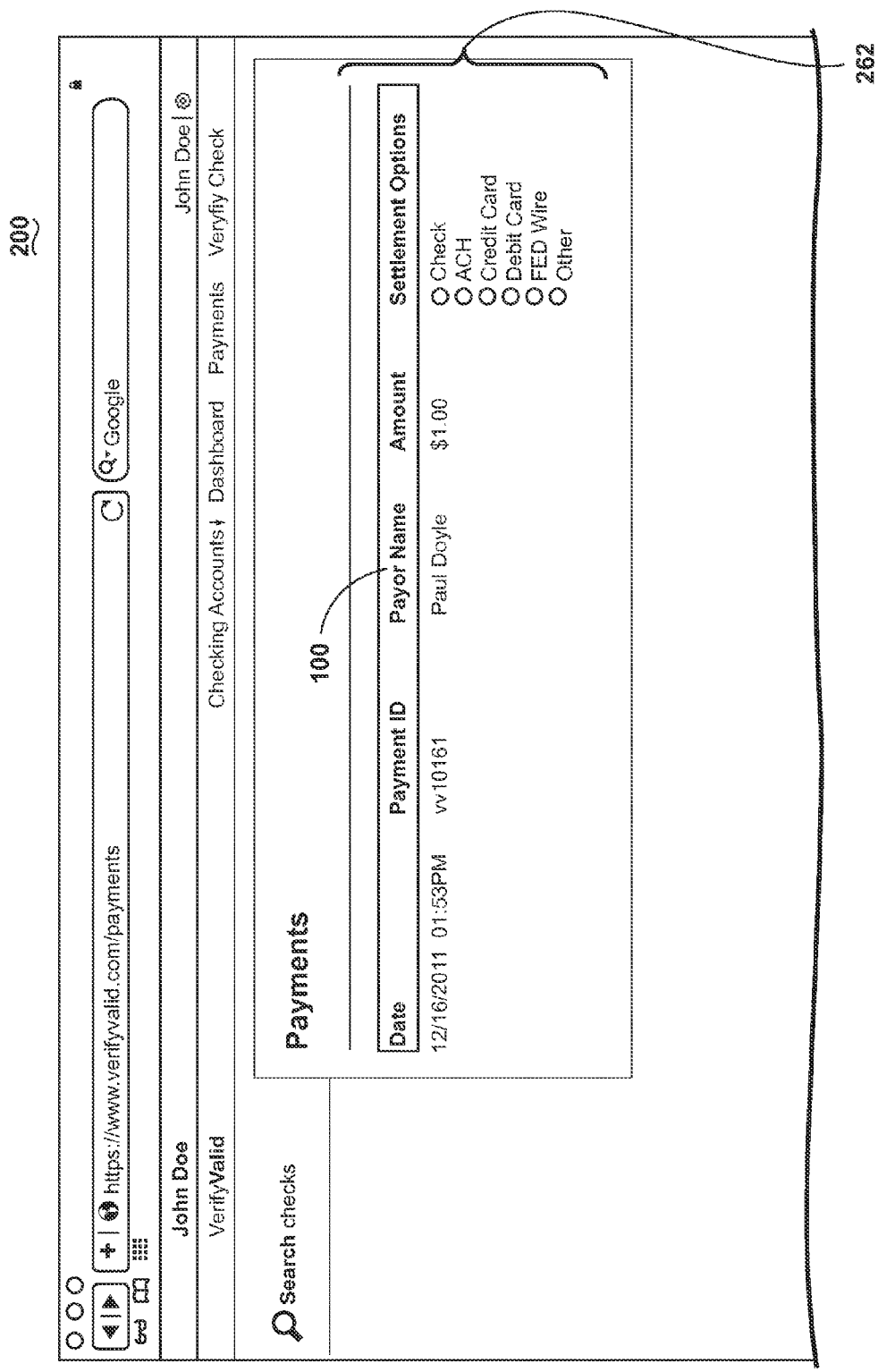
FIG. 16 is an example screenshot for the web interface of FIGS. 3A-3P showing a selection area for the payment settlement types set forth in FIGS. 14-15.

FIGS. 14-16 show another feature of the invention by which the maker 100 can set a number of payment settlement types for the payee 110. Then, after receipt of the transaction, the payee 110 can select from the number of payment settlement types to determine how the transaction will be cleared. For example, turning to FIG. 14, the method 10 is shown where the maker 100 creates a payment data record and authorization 20, 22 and transmits them to the payee 110. Then payee then is presented with a choice 60 among of a number of payment settlement types 62 selected by the maker 100. The payee 110 can then control the form of payment settlement, i.e., including but not limited to a credit card network transaction, a check transaction, an automated clearinghouse (ACH) transaction, a wire transfer, or a another payment system. FIG. 15 shows an alternative embodiment whereby the maker 100 transmits a partially complete transaction 50 to the payee 110 which includes, for example, an amount, a payee, a transaction reference, an authorization, a maker's consent to select the final payment modality from a number of modalities 62 presented in the partially-complete transaction. The payee 110 then makes the final payment modality selection 60 from the various options determined by the maker 110 (or provided as a number of default selections). FIG. 16 shows an additional portion of the interface 200 shown in FIGS. 3A-3P wherein the payment settlement modality selections 62 are set out in a list 262 for the user.

The system and method 10 will allow the maker 100 of a payment or transaction to designate a payee 110 and all or a portion of the criteria needed to finally settle the transaction. For example, an amount and a payee could be provided (or only the amount of the transaction and a subsequent holder of the transaction could later determine the payee 110) with a range of settlement options (check, ACH, card network whether credit or debt, federal wire transfer, or some other settlement system) such that the payee 110 or a subsequent holder decides which of the clearing and settlement methods 62, 262 they would prefer to use. The maker 100 sets the value and can thereafter become indifferent as to which method the payee 110 selects, provided the payment is presented for clearing and settlement only once. The payee 110 can determine the settlement that they prefer, based on price or other criteria. The payee 110 could cause the settlement to be bid for by the various final settlement options.

The method 10, as described with respect to any of the examples in FIGS. 3-10, includes an instance where the maker 100 identifies themselves (e.g. a customer loyalty card/token) to a payee 110 (e.g. retail merchant) and the merchant assembles the bulk of the information with the final step being the maker 100 approving the check (transaction/payment) at the point of sale. Either the maker 100 or the payee 110 could send a communication/message to the other (including via an email address or text message) indicating that they want to perform a payment (give or receive) whereby the two parties could exchange the elements via the initial or an alternate communication channel or they could meet at a third-party service to work to complete all the steps which is not final and official until the maker 100 signifies approval and evidences same via a signature.

The service could be performed via multiple communication channels. The payee or maker could for example initiate via a web or email interface that causes the other party to be contacted via another channel such as receiving a telephone call on their POTS, IP or cellular phone and the process completed by means of oral/verbal interaction with the other party directly or through a 3rd party service 140. A business or individual wishing to pay another party (pay a bill or invoice) sends the other party a check via this method. A business or individual wishing to be paid for requests a payment via this method.

A first example is that a business wants to pay a bill or invoice to another party, vendor, employee, etc. and performs all the steps of compositing a check as a digital item/object and sends this to the other party via the communication network, thereby avoiding the costly, inefficient steps of printing a physical document, putting it in an envelope, supplying postage, depositing it with a courier or the US Mail, etc. Another example is a private party to private party transaction: it is often the case in youth athletics that team members have to pay for things like tournaments, or uniforms, etc. and they may have to pay an intermediary like the team manager. This method would allow for the manager to collect payments via checks either remotely or in person and could forward them on to the final party such as the tournament director or uniform vendor.

Yet another example is a private party to merchant transaction where a shopper in a retail grocery store could proceed to checkout with their selected items, and identify themselves to the store via the method of choice (including their customer loyalty card) and their purchase could be processed as a check for payment without using the credit network but with all the conveniences of credit/debit cards.

A further example is a private party through an intermediary (their child) to a business/merchant transaction. Parents of college age children are often asked for money by their kids for emergencies or for supplies. By this method, the parent could authorize a purchase being made by their child, remotely, in real-time (at the book store or the auto repair shop, etc.) without needing to give their kids a credit card or cash.

Yet another example is a private party to private party where often organizations run fund-raisers (boy scouts and popcorn, girl scouts and cookies, etc.) and they go door to door. When they make these sales they often are given cash (which is dangerous and hard to manage for some) or physical checks. This method could allow the orders to be taken remotely (via email or phone) and the payments collected electronically without the need for credit/debit card capabilities. In another example, a consumer or business to business via the web where individuals and businesses that shop and make purchases via a website could pay via a check where they would otherwise ordinarily only have the option to pay via a credit card.

As a final example, parents are often asked to pay for miscellaneous items/activities for their children (field trips, supplies, special events, etc.) and they could pay via this method without risking giving their child a payment to deliver to school that may be lost in-route.

As highlighted in the examples of usage above, there are several advantages to the disclosed method 10, in that it does not require a piece of paper (a physical paper check) be generated at all but it can be converted (printed) into paper if desired by a party in the process. Therefore, it relieves the maker of the check from the costs and burdens of generating a physical artifact and the burden and costs of conveying a physical item to the payee. Additionally, it can be sent via a communications network to the payee and uses a very well established and legal form of payment in the form of a check. However, it does not suffer from the deficiencies of a conventional check which would need to be fully composited, printed and signed by the maker.

An advantage of the disclosed system and method is that it is fast, efficient, and economical. Furthermore, the transaction can be executed in a highly reliable and secure manner when used in conjunction with other fraud prevention services. The payee can assemble the item (draft check . . . payee, amount, memo, date, etc.) and present it to the maker for them to complete (with their bank routing number, account information check number and evidence of authorization (signature), etc.) and, therefore, presents the advantage of being able to come to agreement, compile information, and complete the transaction in an iterative manner between two parties. As a further advantage, the transaction can be conducted via a 3rd party service which either or both parties use to facilitate and allow for additional efficiencies, accuracy, convenience and speed.

One aspect of the invention is that the maker starts with a need to make a disbursement (payment) and to do so, the maker needs to know the identity of the entity to which they are disbursing and the amount to be disbursed. In current prior art transactions, the disbursing party must determine the final mode by which the payee will receive the payment, including on which set of transactional or institutional rails the transaction will run (i.e., check, ACH, debit card, and the like). In the method contemplated by the invention herein, the maker can allow the disburser to set key elements of the disbursement (most importantly, the payee and amount) and they can allow the final modality of payment to be determined by the payee.

Reasonable variation and modification are possible within the forgoing disclosure and drawings without departing from the spirit of the invention that is defined in the appended claims.

The invention claimed is:

1. A method for compositing and transmitting information for processing a financial transaction between a maker and a payee to whom the maker is providing a payment, the method comprising the steps of:
   receiving, by an electronic device, input from the maker of a data record representative of a financial transaction with the payee, the data record comprising a plurality of data fields, the electronic device configured to display a user interface comprising a form for receipt of the input from the maker to create the data record;
   dividing, by an electronic device, the data record into a first portion comprising some of the plurality of the data fields and a second portion comprising a remainder of the data fields;
   storing at least the first portion of the data record in a unique storage location that is not accessible by the payee;
   electronically transmitting the second portion of the data record over a communication network to the payee with an identifier representative of the unique storage location of where the first portion of the data record is stored, said identifier not including the data fields of the first portion of the data record, wherein the electronic transmission includes an authorization by the maker to the payee to negotiate the data record; and
   retrieving the stored first portion of the data record using the identifier representative of the unique storage location and reconstituting the data record from the stored first portion and the electronically transmitted second portion prior to or at the time of presentment to a bank of first deposit, wherein the payee presents at least the second portion of the data record to the bank of first deposit for disbursement of the payment to the payee.

2. The method of claim 1 wherein the step of transmitting the second portion of the data record comprises sending an email, a text message or both to the payee.

3. The method of claim 2 wherein the step of transmitting the second portion of the data record includes attachment of a file to the email which includes a printable representation of a check representative of the second portion of the data record.

4. The method of claim 2 wherein the step of transmitting the second portion of the data record includes the step of entailing a data file which contains data that can be constructed into at least one of a physical check or an electronic image of a check.

5. The method of claim 4 wherein the electronic image of the check is compliant with Check 21 standards.

6. The method of claim 1 wherein the form for receipt of the input from the maker is a graphical representation of a check, the method further comprising the step of the maker electronically signing the graphical representation of the check at the time of receiving the input from the maker, and the step of electronically transmitting the second portion of the data record includes the step of transmitting the graphical representation of the check to the payee.

7. The method of claim 6 and further comprising the step of the payee physically printing the graphical representation of the check prior to presentment to the bank of first deposit.

8. The method of claim 1 wherein the electronic device is located on a global computer network and the user interface is configured to at least one of:
   (a) receive physical address information regarding at least one maker;
   (b) receive bank account information regarding at least one maker;
   (c) receive information regarding at least one payee for the at least one maker;
   or (d) receive payment information regarding a payee and an amount, wherein the form displayed on the user interface reflects a standard paper check form.

9. The method of claim 8 and wherein the step of creating the data record representative of the financial transaction includes the step of constructing the data record from stored information entered into the user interface.

10. The method of claim 1 wherein, upon receiving the second portion of the data record, the payee performs at least one of the following to present the second portion of the data record to the bank of first deposit:
    (a) printing the second portion of the data record into a form representative of a traditional paper check;
    or (b) transmitting a graphical representation of the second portion of the data record in a form representative of a traditional paper check to the bank of first deposit.

11. The method of claim 1 and further comprising the step of providing a cryptographic or trusted timestamp associated with the transaction to prevent tampering with, or multiple presentment of, the second portion of the data record to multiple banks of first deposit.

12. The method of claim 1 and further comprising the step of the payee selecting the form of the second portion of the data record for presentment to the bank of first deposit.

13. A method for compositing and transmitting information for processing a financial transaction between a maker and a payee to whom the maker is providing a payment, the method comprising the steps of:
receiving, by an electronic device, input from the maker of a data record representative of a financial transaction with the payee, the data record comprising a plurality of data fields, the electronic device configured to display a user interface comprising a form for receipt of the input from the maker to create the data record;
electronically transmitting at least some of the plurality of the data fields of the data record over a communication network to a unique storage location that is not accessible by the payee;
electronically transmitting a subset of the plurality of the data fields of the data record over a communication network to the payee with an identifier representative of the unique storage location, said identifier not including the data fields of the first portion of the data record, wherein the electronic transmission includes an authorization by the maker to the payee to negotiate the data record; and
retrieving at least some of the data fields from the unique storage location by using the identifier and combining the retrieved at least some of the data fields with the subset of the plurality of the data fields of the data record received from the payee to settle the financial transaction; wherein the payee presents at least the second portion of the data record to a settlement representative for disbursement of the payment to the payee.

14. The method of claim 13 and further comprising the maker providing a plurality of payment settlement modalities to the payee, and the payee selecting from at least one of the provided plurality of payment settlement modalities for presentment to at least one of a bank of first deposit or another settlement representative based on the selected settlement modality to settle the financial transaction received from the maker.

15. The method of claim 14 wherein the plurality of payment settlement modalities comprises a credit card network transaction, a check transaction, an automated clearinghouse (ACH) transaction, or a wire transfer.

16. The method of claim 13 wherein the subset of the plurality of the data fields of the data record comprises a set of fields in which the financial transaction cannot be settled without information contained in the at least some of the plurality of the data fields of the data record stored in the unique storage location.

17. The method of claim 13 wherein the settlement representative comprises a bank of first deposit.

18. A system for compositing and transmitting information for processing a financial transaction between a maker and a payee to whom the maker is providing a payment, the system comprising:
at least one processor; and
a memory including instructions that, when executed by the at least one processor, cause the at least one processor to perform operations to:
receive input from the maker of a data record representative of a financial transaction with the payee, the data record comprising a plurality of data fields;
divide the data record into a first portion comprising some of the plurality of the data fields and a second portion comprising a remainder of the data fields;
store at least the first portion of the data record in a unique storage location that is not accessible by the payee;
electronically transmit the second portion of the data record over a communication network to the payee with an identifier representative of the unique storage location of where the first portion of the data record is stored, said identifier not including the data fields of the first portion of the data record, wherein the electronic transmission includes an authorization by the maker to the payee to negotiate the data record; and
retrieve the stored first portion of the data record using the identifier representative of the unique storage location and reconstitute the data record from the stored first portion and the electronically transmitted second portion prior to or at the time of presentment to a bank of first deposit, wherein the payee presents at least the second portion of the data record to the bank of first deposit for disbursement of the payment to the payee.

19. The system of claim 18 wherein the instructions to electronically transmit the second portion of the data record further comprises instructions to cause the at least one processor to send, to the payee, at least one output of a set of outputs, the set of outputs comprising an email and a text message.

20. The method of claim 19 wherein the instructions to electronically transmit the second portion of the data record further comprises instructions to cause the at least one processor to attach a file to at least one output, the file comprising a printable representation of a check representative of the second portion of the data record.

21. The method of claim 19 wherein the instructions to electronically transmit the second portion of the data record further comprises instructions that cause the at least one processor to email a data file comprising data to construct at least one of a physical check and an electronic image of a check.

* * * * *

UNITED STATES PATENT AND TRADEMARK OFFICE
CERTIFICATE OF CORRECTION

PATENT NO. : 9,613,343 B2
APPLICATION NO. : 13/351919
DATED : April 4, 2017
INVENTOR(S) : Doyle et al.

Page 1 of 1

It is certified that error appears in the above-identified patent and that said Letters Patent is hereby corrected as shown below:

In the Claims

In Column 14, Line 24, in Claim 4, delete "entailing" and insert --emailing-- therefor Signed and Sealed this
Twenty-eighth Day of May, 2019

Andrei Iancu
*Director of the United States Patent and Trademark Office*